(12) United States Patent
Galiber

(10) Patent No.: US 11,712,742 B2
(45) Date of Patent: Aug. 1, 2023

(54) RING-SAW ASSEMBLIES AND PROCESSES

(71) Applicant: Edward M. Galiber, Washington, DC (US)

(72) Inventor: Edward M. Galiber, Washington, DC (US)

( * ) Notice: Subject to any disclaimer, the term of this patent is extended or adjusted under 35 U.S.C. 154(b) by 163 days.

(21) Appl. No.: 16/967,826

(22) PCT Filed: Mar. 21, 2019

(86) PCT No.: PCT/US2019/023330
§ 371 (c)(1),
(2) Date: Aug. 6, 2020

(87) PCT Pub. No.: WO2019/183327
PCT Pub. Date: Sep. 26, 2019

(65) Prior Publication Data
US 2021/0031279 A1    Feb. 4, 2021

Related U.S. Application Data

(60) Provisional application No. 62/646,984, filed on Mar. 23, 2018.

(51) Int. Cl.
*B23B 51/04*    (2006.01)

(52) U.S. Cl.
CPC ....... *B23B 51/0473* (2013.01); *B23B 51/0411* (2022.01); *B23B 2251/02* (2013.01)

(58) Field of Classification Search
CPC ... B23B 51/0473; B23B 51/041; B23B 51/04; B23B 51/05; B23B 51/08; B23B 51/108; B23B 51/104; B23B 51/0426; B23B 51/0433; Y10T 408/375
See application file for complete search history.

(56) References Cited

U.S. PATENT DOCUMENTS

| | | | | |
|---|---|---|---|---|
| 1,554,669 | A | * 9/1925 | Watkins | B23B 5/168 407/45 |
| 2,482,439 | A | 9/1949 | Smith | |
| 2,803,153 | A | * 8/1957 | Golbeck | B23B 51/05 408/174 |
| 3,266,346 | A | 8/1966 | Voissem | |
| 3,382,743 | A | * 5/1968 | Trevathan | B23B 51/04 125/20 |
| 3,771,895 | A | * 11/1973 | Meyer | B23B 51/05 408/157 |

(Continued)

FOREIGN PATENT DOCUMENTS

| | | |
|---|---|---|
| CA | 2787235 C | 7/2011 |
| KR | 20000010570 A * | 2/2000 |

OTHER PUBLICATIONS

KR20000010570A Machine Translation. (Year: 2022).*

(Continued)

*Primary Examiner* — Nicole N Ramos
(74) *Attorney, Agent, or Firm* — Fitch, Even, Tabin & Flannery, LLP

(57) ABSTRACT

Hole-saws are provided herein, and more specifically to hole-saw assemblies and processes having adjustable platters for multiple simultaneous saw components, optional elimination of a guide drill, and the ability to retrieve cores of a sawed work piece before sawing completely through the workpiece. One hole-saw device, may have a motive force; a base plate rotatable by the motive force; cutters; and locking mechanisms to mount the base plate to the cutters.

11 Claims, 35 Drawing Sheets

(56) References Cited

U.S. PATENT DOCUMENTS

| | | | | |
|---|---|---|---|---|
| 4,072,441 | A * | 2/1978 | LaPointe | B23B 51/0426 |
| | | | | D15/139 |
| 6,881,017 | B1 | 4/2005 | Krecek et al. | |
| 7,097,397 | B2 | 8/2006 | Keightley | |
| 7,134,815 | B2 * | 11/2006 | Steer | B23B 51/0473 |
| | | | | 408/239 R |
| 7,850,405 | B2 | 12/2010 | Keightley | |
| 7,938,600 | B1 * | 5/2011 | Griep | B23B 51/044 |
| | | | | 408/239 R |
| 10,442,011 | B1 * | 10/2019 | Davis | B23B 51/0473 |
| 2003/0063956 | A1 * | 4/2003 | Burk | B23B 51/04 |
| | | | | 408/209 |
| 2007/0166116 | A1 * | 7/2007 | Olson | B23B 51/0473 |
| | | | | 408/204 |
| 2008/0181738 | A1 * | 7/2008 | Capriotti | B23B 51/105 |
| | | | | 408/207 |
| 2010/0080665 | A1 * | 4/2010 | Keightley | B23B 51/0466 |
| | | | | 408/204 |
| 2013/0039708 | A1 * | 2/2013 | Stenman | B28D 1/041 |
| | | | | 408/196 |
| 2017/0001249 | A1 * | 1/2017 | Hoop | B23B 51/0466 |
| 2017/0310095 | A1 * | 10/2017 | Herth | H02G 1/00 |

OTHER PUBLICATIONS

International Search Report for PCT/US2019/023330 dated Jun. 7, 2019 (2 pages).
Written Opinion of the ISA for PCT/US2019/023330 dated Jun. 7, 2019 (6 pages).

* cited by examiner

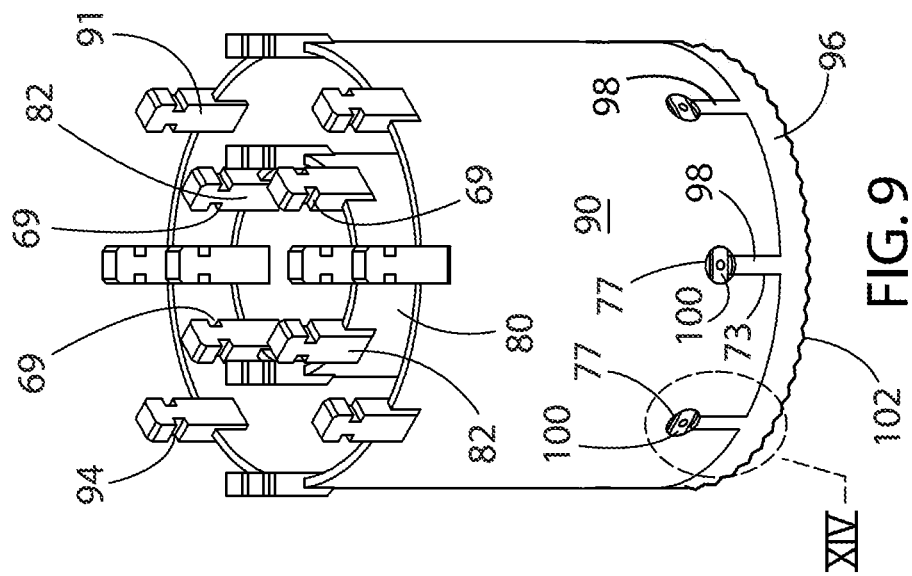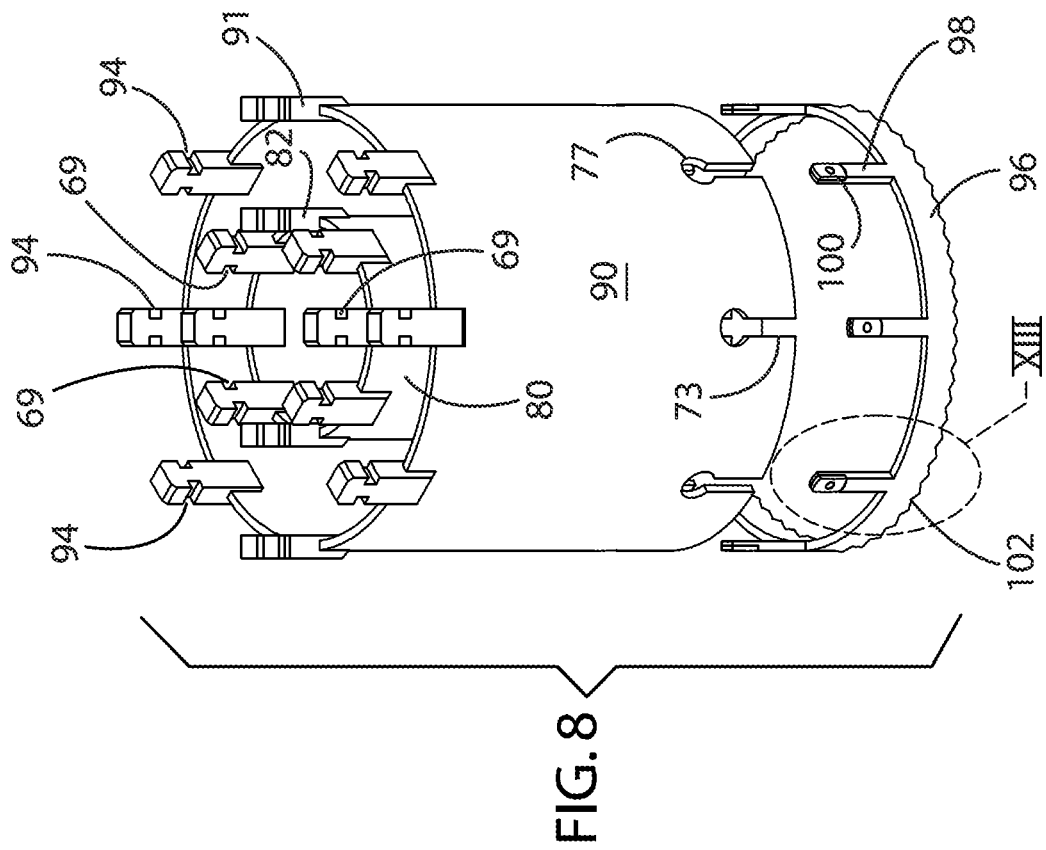

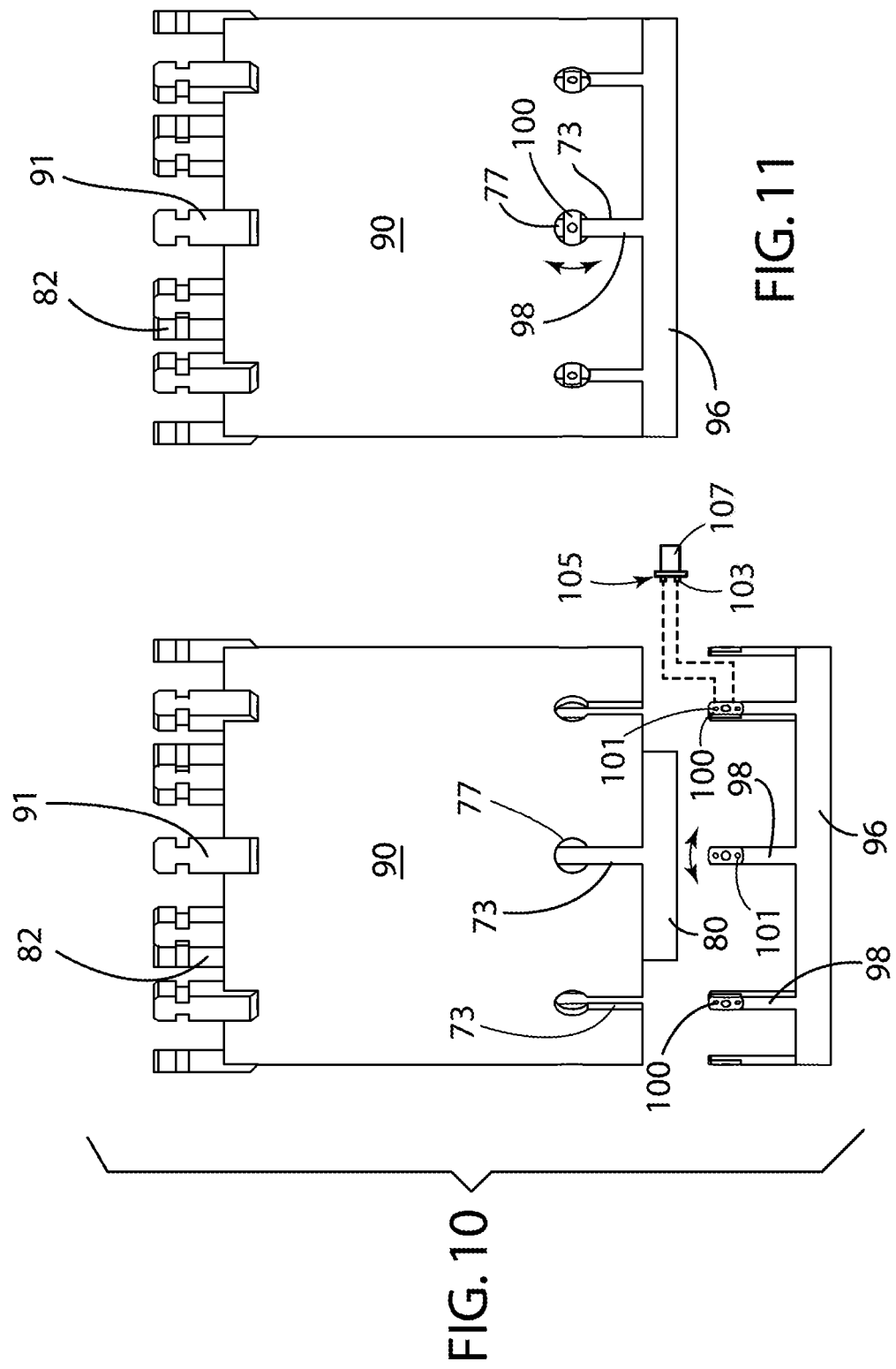

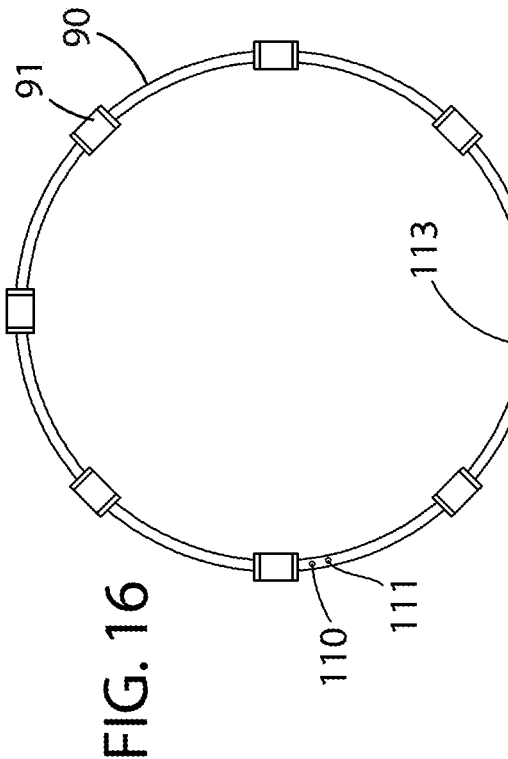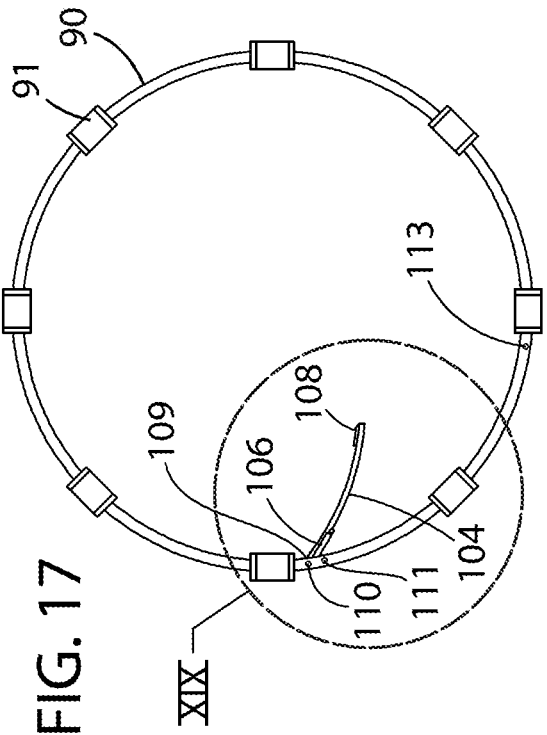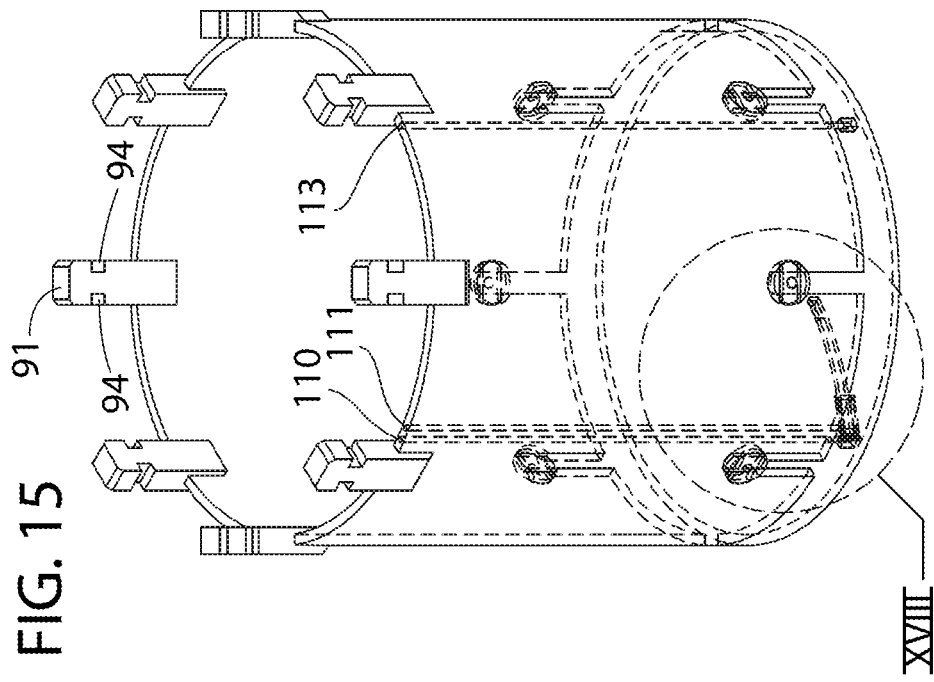

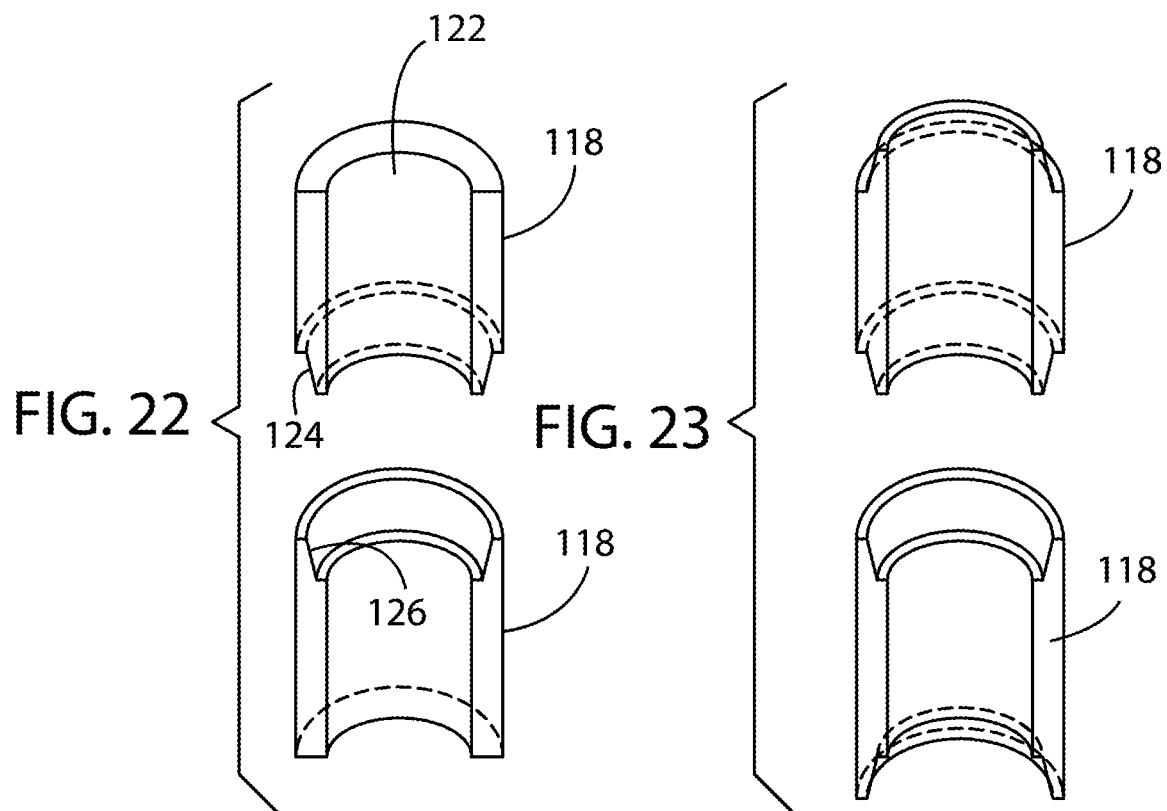
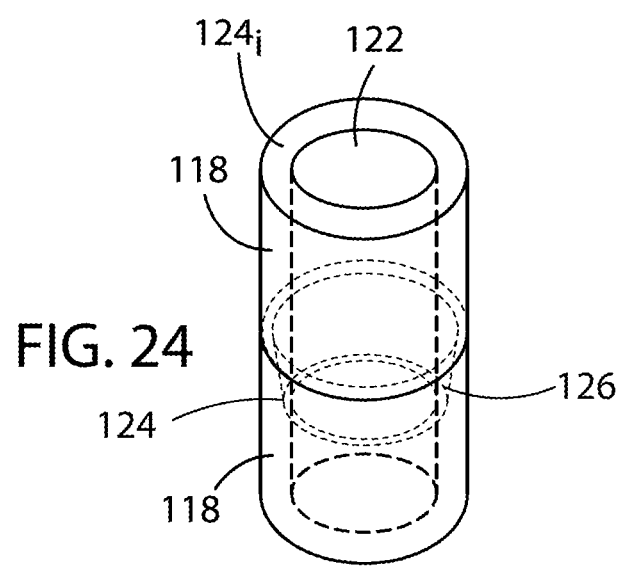

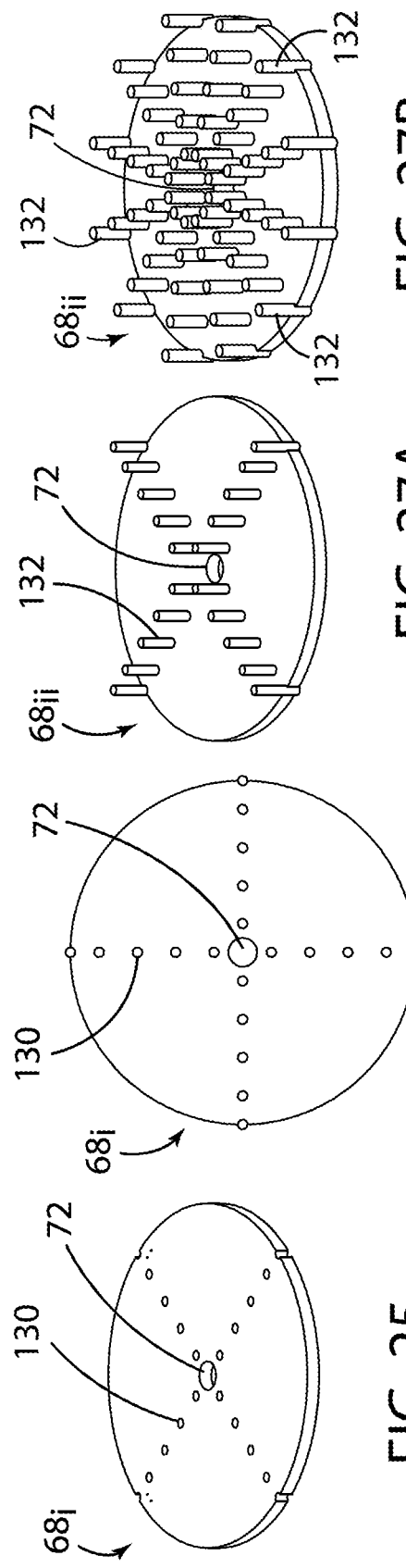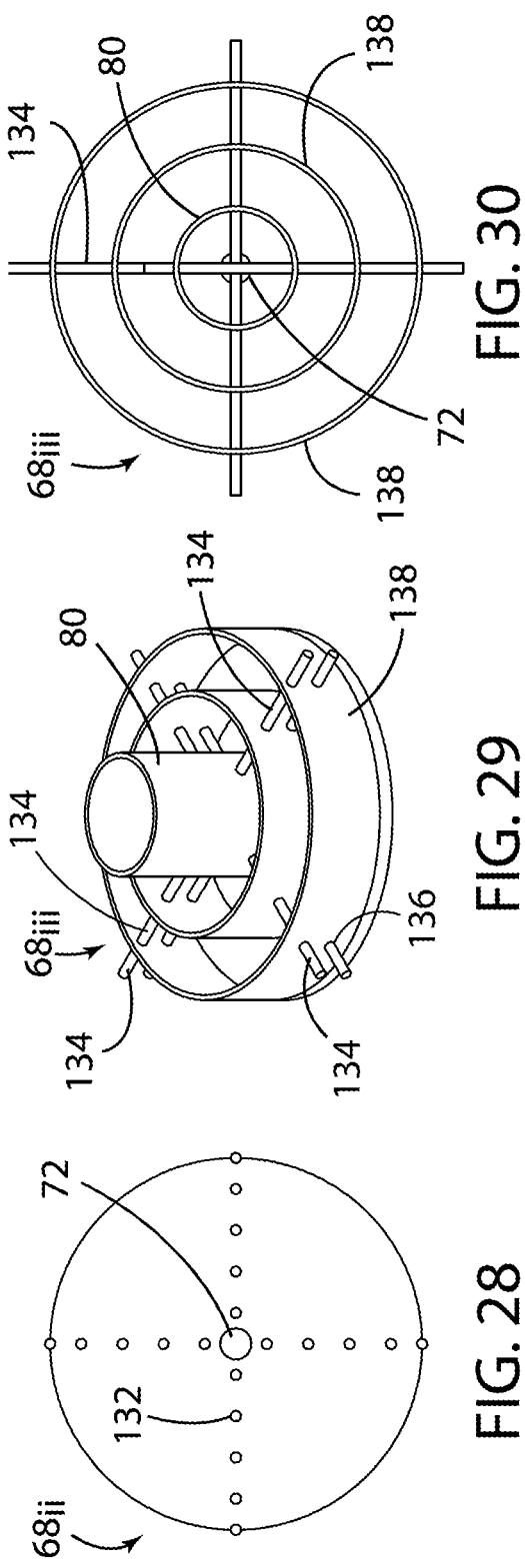

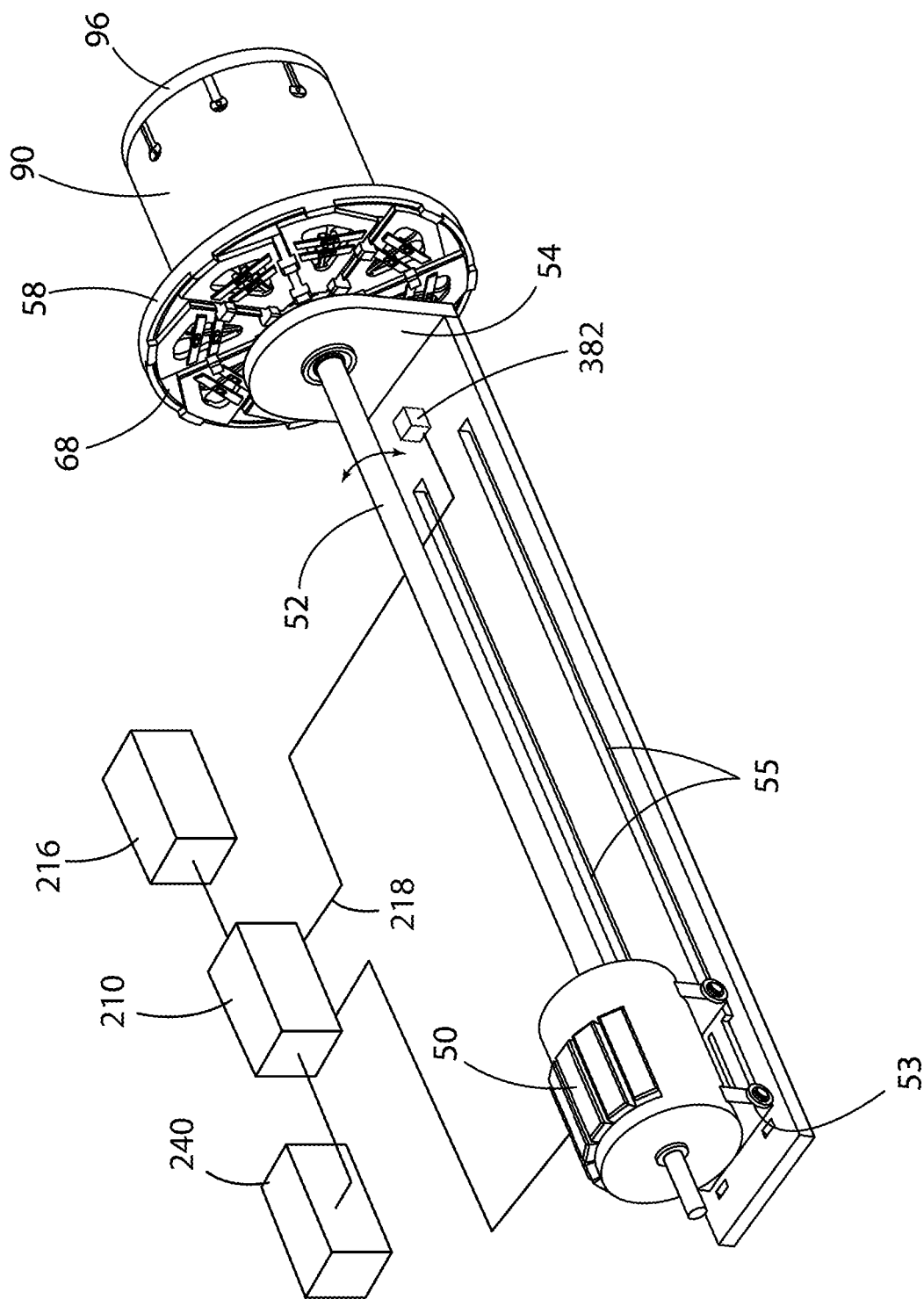

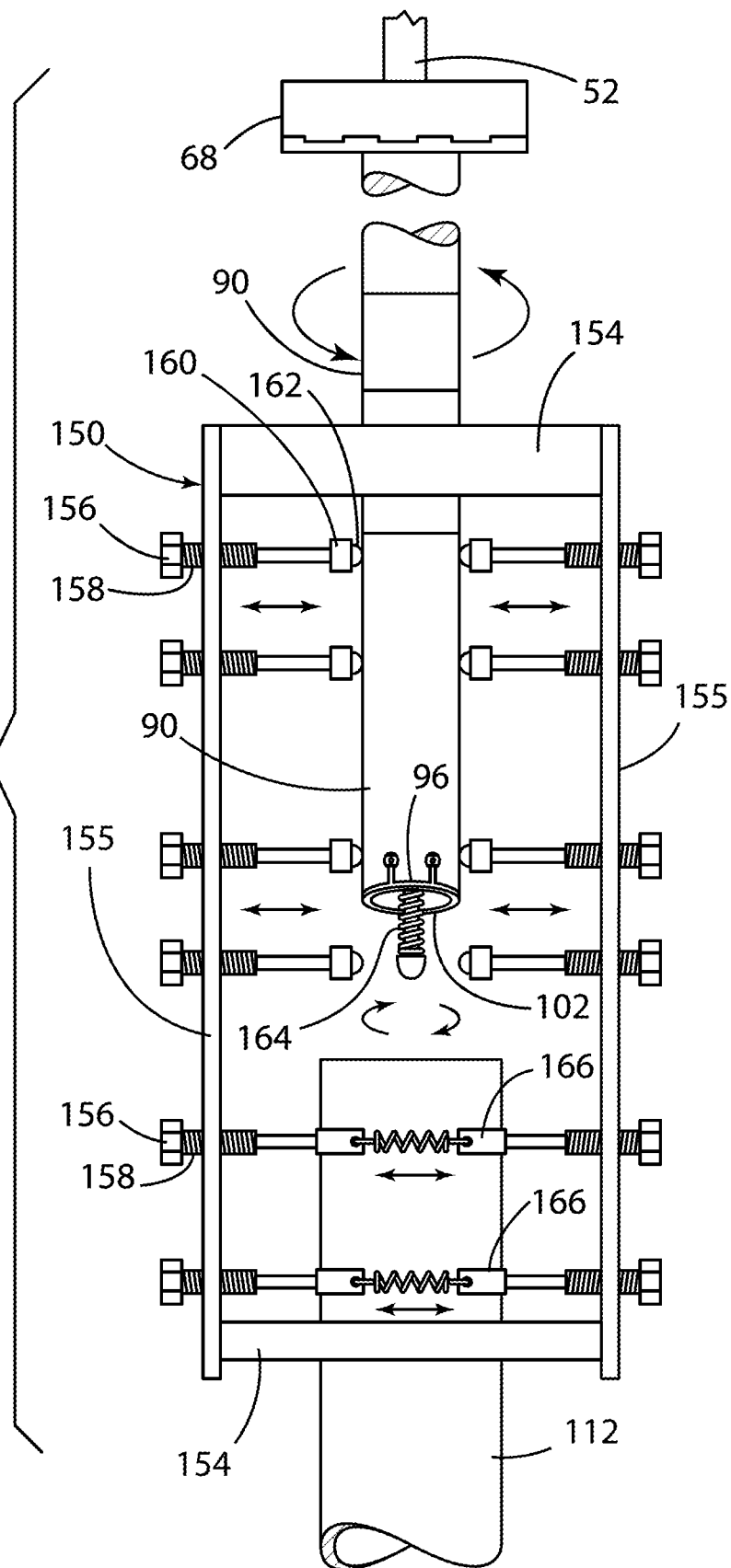

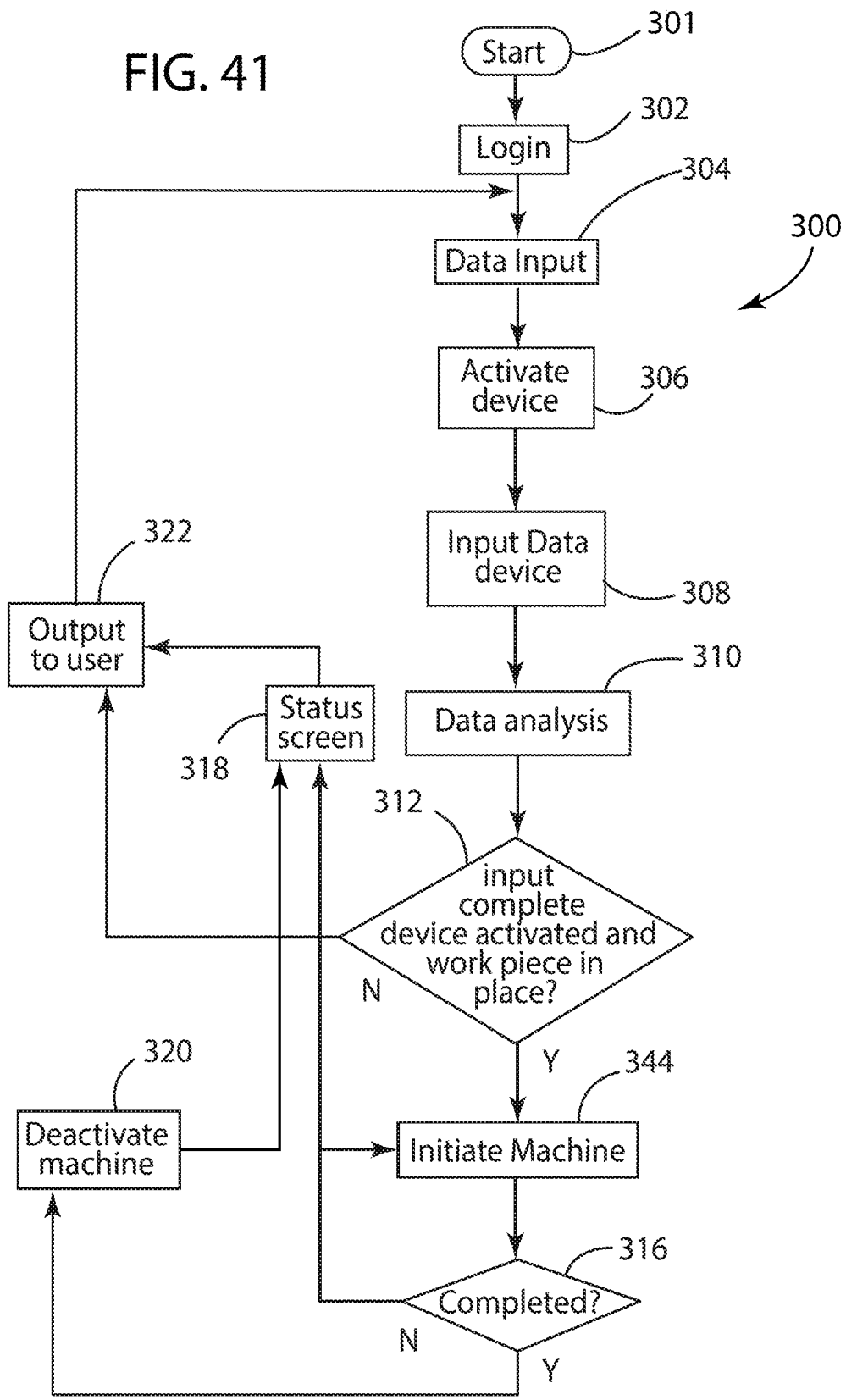

RING-SAW ASSEMBLIES AND PROCESSES

CROSS-REFERENCE TO RELATED APPLICATIONS

This application is a U.S. national phase application filed under 35 U.S.C. § 371 of International Application No. PCT/US2019/023330, filed Mar. 21, 2019, designating the United States, which claims priority from U.S. Provisional Patent Application No. 62/646,984, filed Mar. 23, 2018, which are hereby incorporated herein by reference in their entirety for all purposes.

FIELD

The present disclosure relates generally to ring-saws, and more specifically to ring-saw assemblies and processes having adjustable platters for mounting multiple saw components simultaneously.

BACKGROUND

Around every circle a larger circle can be drawn. Drill bits and hole-saws are known to craftsmen for sawing holes of a variety of sizes into a work pieces of a variety of materials. Both drill bits and hole-saws are typically locked into a mandrel or chuck and rotated at high or low speeds to cut through a work piece.

In particular, a hole-saw is useful for cutting large holes that are impractical for a drill bit. Hole-saws can include a flat, solid or fused base which provides support for a cylindrically shaped cutter having cutting teeth at its circular end. The hole-saw base is generally locked by a drill mandrel and can include a center hole through which a pilot drill bit, also locked by the mandrel, may pass. Some hole-saw bases are known to include multiple diameter grooves adapted to accommodate hole-saws of different diameters. Typically though, a full cut all the way through the material must be taken. Accordingly, the cutting cylinder must extend beyond the cut through the workpiece.

Some advances in the art have included hole-saw configurations to allow concentrically larger holes without a guide drill, such as disclosed in U.S. Pat. No. 6,881,017 to Krecek et al. Other configurations have developed simultaneous use of two different sized hole saws, such as disclosed in U.S. Pat. Nos. 7,097,397 and 7,850,405 to Keightley. Here, the internal hole-saw blade can act as an aligning pilot drill that is of slightly less diameter to the hole, while the outer blade is used to cut the desired hole.

Despite these advances, a hole-saw that can provide an adjustable mount for a variety of multiple hole-saw diameters simultaneously, does not require a pilot drill, can retrieve the core of the sawed work piece without cutting all the way through the work piece, and providing a tool that has the capability of providing additional functionality (such as transverse cuts internal and external to the hole-saw diameter) has proven challenging.

SUMMARY

The present disclosure relates generally to hole-saws, and more specifically to hole-saw assemblies and processes having adjustable platters for multiple simultaneous saw components, optional elimination of a guide drill, and the ability to retrieve cores of a sawed work piece before sawing completely through the workpiece.

Extendable multi-ringed hole-saw assemblies and methods are disclosed and configured to create a multiplicity of circular forms including, for example, solid disks, solid cylinders, hollow tubes, disk circles and the like. The resultant forms can be created from a variety of materials, including wood, metal, stone, ice, composite materials, plastics, combinations thereof, and the like. Optionally, transverse cutters can be included to make transverse cuts externally or internally to the cylindrical cutter. Also, the assemblies and methods can include external guides to hold and/or stabilize the workpiece and/or the cutter while the device is in operation. One approach provides: a motive force, a base plate rotationally connected to the motive force, a locking mechanism to connect one or more cutters and/or cutter extensions to the base plate, and a locking mechanism disposed flush within the extension to connect an extension to the cutter.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The foregoing features, as well as other features, will become apparent with reference to the description and figures below, in which like numerals represent like elements, and in which:

FIG. 8 illustrates an exploded perspective view of an extension 90 and cutting ring 96 assembly in accordance with a first embodiment with two cutting rings and the rotational locking disk for outer extension 100 set vertically to all the cutting ring locking disk 100 mounting tab to slide into place on the receptacle for locking disk 100 on cutting ring 90.

FIG. 9 illustrates a perspective view of an assembled extension 90 and cutting ring 96 assembly in accordance with a first embodiment with two cutting rings and the rotational locking disk for outer extension 100 turned 90 degrees to lock the cutting ring in place.

FIG. 10 illustrates an exploded side view of an extension 90 and cutting ring 96 assembly in accordance with a first embodiment with two cutting rings.

FIG. 11 illustrates a side view of an assembled extension 90 and cutting ring 96 assembly in accordance with a first embodiment with two cutting rings.

FIG. 15 illustrates a perspective view of an assembled extension 90 and cutting ring 96 assembly in accordance with a second embodiment with one cutting rings and an optional lateral cutting arm in an extended position.

FIG. 16 illustrates an end view of an assembled extension 90 and cutting ring 96 assembly in accordance with a second embodiment with one cutting rings and an optional lateral cutting arm in a retracted position.

FIG. 17 illustrates an end view of an assembled extension 90 and cutting ring 96 assembly in accordance with a second embodiment with one cutting rings and an optional lateral cutting arm in an extended position.

FIG. 22 illustrates an exploded perspective cutaway view of a resultant workpiece after cutting rings and the cutting arm have been have been extended laterally into it to form a top section and a bottom section.

FIG. 23 illustrates an exploded perspective cutaway view of a resultant workpiece after cutting rings and the cutting arm have been have been extended laterally into it to form a a plurality of mid-sections.

FIG. 24 illustrates an assembled perspective view of a resultant workpiece after cutting rings and the cutting arm have been have been extended laterally into it to form a top section and a bottom section.

FIG. 25 illustrates a perspective view of another approach to the platter 68*i*.

FIG. 26 illustrates an end view of another approach to the platter 68*i*.

FIG. 27A illustrates a perspective view of platter 68*i*, showing the minimal number of pins in a crisscross formation, FIG. 27B illustrates a perspective view of an alternate platter 68*ii*, showing concentric rows of pins.

FIG. 28 illustrates an end view of platter 68*i* with pins.

FIG. 29 illustrates a perspective view of another approach to the platter 68*iii*.

FIG. 30 illustrates an end view of another approach to the platter 68*iii*.

FIG. 38 illustrates a perspective side view of an assembled platter 68 in a locked position, extension 90 and cutting ring 96 assembly in accordance with a first embodiment with two cutting rings and having a rotational motive force, a carriage for the motive force and ways for the carriage to travel.

FIG. 39 illustrates an exemplary side view of an assembled system according to another approach.

FIG. 41 illustrates an exemplary algorithm for use in implementing material cutting methods, techniques, devices, apparatuses and the like, in accordance with some of the present embodiments.

Figure 1:
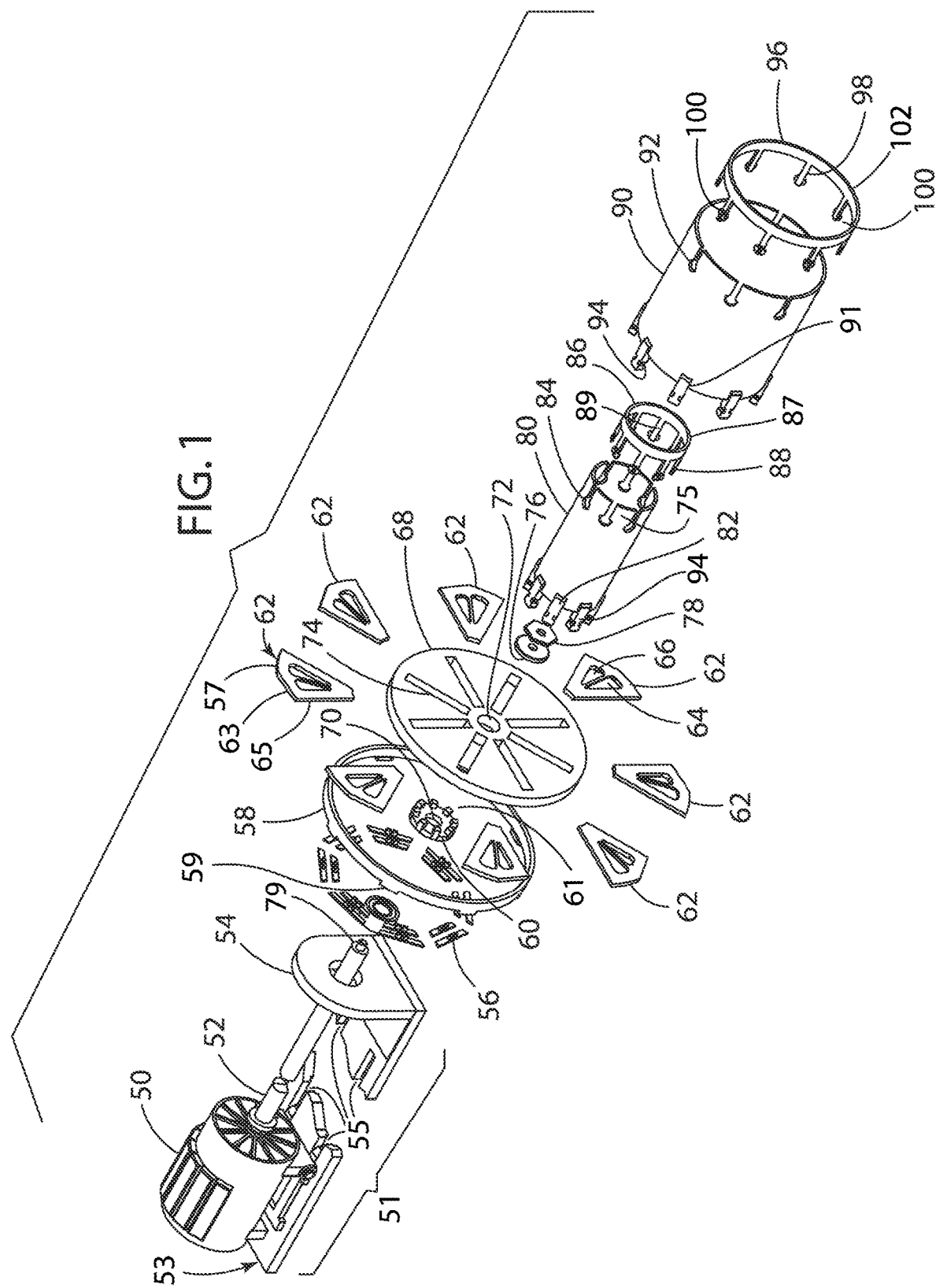
FIG. 1 illustrates an exploded perspective view of a hole-saw assembly in accordance with a first embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Introduction

Extendable multi-ringed hole-saw assemblies and process are disclosed that are configured to create a multiplicity of highly customizable circular forms including, for example, disks, cylinders, hollow tubes, and the like. The forms can be created from a variety of materials, including wood, metal, stone, ice, composite materials, plastics, combinations thereof, and the like. The current embodiments can create any sized tubular structures out of numerous materials and/or substrates for any diameter and/or wall thickness. The assemblies and processes of the present embodiments can cut, lift, and optionally polish a work piece or a substrate, in situ. Optionally, transverse cutters and/or polishers can be included to make transverse cuts toward or away from the center of the workpiece or substrate. It is noted that herein the terms "cut" or "saw" can also include polishing, sanding, and the like and combinations thereof.

The present embodiments can be generally described as a tubular saw having one or more "cylindrical ring saws" of any predetermined diameter and length, which are placed in synchronized alignment through secured locking plates to enable simultaneous cutting of any given substrate to whatever thickness or diameter of the substrate is desired. According to one approach, basic components of the assemblies and processes of the present embodiments can include: a motive force connected to a driveshaft, which in turn rotates an adjustable platter on which cutters and extensions may be attached in infinite combinations. The assemblies and processes of the present embodiments can also optionally include an external guide/stabilizer to hold some workpieces in place while the device is cutting; devices to retrieve a workpiece from a substrate; and or mechanisms to retrieve cuttings from the workpiece while the cutters are cutting.

The present embodiments provide tools that can be the genesis of an infinite range of products, structural applications, and designs.

Products and Uses

The present embodiments can be used to create a plethora of useful products in a cost efficient manner minimizing waste, and preserving resources used as substrates or workpieces. Exemplary products that could be produced by the present embodiments could include: structural support columns, housing framework, trellises, geodesic structures, banister poles, chairs, doors, retainer walls, piers, cutlery handles, napkin rings, jewelry, rings, necklaces, bracelets, paper weights, candle holders, stone utility poles, retainer walls, grave stones, kaleidoscope, tora tubes, crosses and crucifixes, vases, totem poles, bird feeders, walking sticks, canes, podiums, roof tiles, bed posts, barrels, cigar tubes, wine tubes, chalices, wind chimes, canisters, stone flooring tiles, chandeliers, hardwood flooring in new patterns, laminate cylindrical plywood like layered structural tubes, vertical garden designs, round chimneys, thin cylinders of stone and wood nested inside of one another, and the like. Substrates could include but not be limited to wood, stone, ice, rock, plastic, bone, coral, shell, lava rock, granite, marble, plaster, foods and the like. Of great interest, tubular structures can be cut out of stone and wood (both plentiful resources and in the case of wood, renewable) to a designed wall thickness.

In use, the present embodiments can utilize two or more cylindrical cutters, which allows two products to be formed simultaneously. A first product can be a tube of a desired diameter and wall thickness. A second product could be the center dowel formed from the cutting of the cylinder of any desired diameter. If more than two cylindrical ring saws are used simultaneously, the products will always equal the number of saws utilized plus one more product which will always be a center dowel. In short the number of cutters equals the number of usable products.

Thus, the present embodiments can be used to create partial tubular wall structures or other unique shapes from any given substrate. The present embodiments can capture/expose unique features from coring various substrates in this manner, such as grains of wood or wood's concentric ring patterns as well as internal patterns of rocks and precious stones.

The present embodiments can create a plant trellis from hollow coring of granite or stone that allows plants to grow out of it. When using that design on highways you can create a living plant wall in front of the sound barriers at the highways while providing mechanical protections as well. Retaining walls can be set up so that they have weep holes made by the present embodiments and allow drainage of the water from inside of stone tubes. Granite compositions could replace high maintenance metal pipes. Alternately some products such as utility poles may have a small metal core pole that could either be solid or hollow inside of the hollow column (such as a wood column) to allow stacking of the hollow cylinder columns allowing shorter cylinders to be use and allow trees to be harvested earlier accelerating their function and usage or allowing stone cylinders to be stacked to any height as required. Retainer wall design options can include vertical and horizontal stone tubes or dowels. Planter options are available for vertical retainer wall tubes and single standing stone tubes.

One use envisioned using the present embodiments is to reduce the waste associated with wood. The majority of wood in our society is left to rot, split into firewood, or ground into mulch because the capability of creating wood products traditionally lies with lumber yards. Since most wood does not meet lumber yard specifications, it is a vastly underutilized resource. The present embodiments allow individuals and small business entities to develop a wide range of products that could effectively compete with large manufacturers. The present embodiments could spark a whole new industry among small manufactures because heavy equipment and manufacturing would not be required to create usable products. For example, the extraction of a tree's root systems could be perfected in some embodiments as opposed to simply grinding and removing a stump. The present embodiments can turn this resource from an item to be discarded to a raw material for people to make useful and/or decorative products.

The present embodiments allow artisans to create a wide variety of stone and granite items beyond basic sculpting, allowing new types of designs, greater creativity, greater ease of production, and far less waste of materials and time. Through form design and carving, an infinite number of product forms and designs can be created with the present embodiments. Solid or hollow stone can provide maintenance free building materials superior to other methods know in the art.

Products from the current embodiments could include creating a supply of rigid columns to form large tubular networks. This could be envisioned as setting up underground tunnels with a granite tubular system similar to the way in which banking tubes are used to transport items between locations within a building, but on a much bigger scale to the point of transporting larger items and even people. The current embodiments could also optionally provide polishing tools to provide a smooth interior surface.

The present embodiments could also be used to bore into a substrate to create tunnels for utilities, sewers, and transit. If the substrate is stone, rather than just grinding through the substrate, which is disposed, the present embodiments could, while creating the tunnel be simultaneously creating useful columns and dowels that can be used as building materials off-site, e.g., the columns for structural support and the dowels for utility poles.

Tubular building beams can be cut out of stone (a plentiful substrate) to a designed wall thickness and utilized as internal structural supports for housing construction instead of relying solely on wood or metal construction. These beams, especially of stone, could be maintenance free and also more capable of withstanding natural disasters. Stone support and framing beams can provide more structural support than wood framing and potentially allow for new forms of home and building designs.

Hardwood floors are traditionally produced from old growth forest trees and follow a linear planking design system that hasn't been challenged in decades. With designing templates, the present embodiments with standardized cutting can allow new and innovative designs for hardwood flooring from trees not deemed suitable for shipping to a major lumber yard. The tubular saws can cut larger dowels that can be formed into flooring disks of various shapes that can be interlocked.

Thus, when more than two cylindrical ring saws are used simultaneously, the products will always equal the number of saws utilized plus one more product which will always be a center dowel. The tubes created will be of the desired diameter and wall thickness as set by the user. The dowel will be the desired diameter as set by the user. The two or more cylindrical ring saws can range from microscopic diameters to any upper size with limitations only by the feasibility of production of the cylindrical ring saws and the mechanism to turn them. The length of the multi-cylindrical ring saws can be any desired length and utilized as is accessible to the lower limit of the cut substrate.

General Assembly Configurations

The present embodiments provide flexible configurations that can provide multiple cylindrical saws, with or without a bit guide, with or without a stabilizer system. Generally, the present embodiments provide hole-saw assemblies mounted to extension components connected to a motive force. The present embodiments can be of any diameter and the saws can be of various thicknesses and include two or more saws cutting simultaneously into the substrate.

The present embodiments can provide any series of two or more cylindrical saws that are positioned to simultaneously cut circularly into a given substrate. In the prior art, cylindrical saws are designed to create holes of various diameters. For the present embodiments, tubes of various desired diameters and wall thickness are created. Thick structural walls with narrow center diameters or walls thin as veneer can be produced.

Other general components of the present embodiments may include assemblies that can lower the saw down on the substrate to be cut in a way to minimize vibration and maintain accuracy for the cut and the diameter and thickness desired and the substrate. Due to the extensive range of variations users will require in utilizing this tool, many possible designs for locking/securing tabs to attach to the locking/securing plate mechanisms that hold the cylindrical ring saws are possible. There are also several potential mechanisms for interlocking the extension lengths to be added to a tubular saw when cutting the substrate. The present embodiments may have locking/securing tab mechanisms that include but not be limited to: cylindrical tips that may clip into or otherwise be secured into cylindrical holes in the locking/securing plate mechanism; ring assemblies that clip onto or are otherwise secured onto spindle versions of the locking/securing plate mechanism; or other geometric shapes that facilitate bi-directional spin action with minimal positional distortion.

The multi-cylindrical ringed tubular saw system is two or more "cylindrical ring saws" of any given diameter and any given length which are placed in synchronized alignment through fused assembly or are individual hole saws otherwise secured through locking plate mechanisms to enable cutting any given substrate into multiple tubular structures with a dowel structure simultaneously.

According to one approach, the present assemblies can include a multi-cylindrical ringed tubular saw system that includes cylindrical ring cutting edges placed on interlocking multi-cylindrical tubular structures that provide minimal grooving in the substrate. The extension cylindrical rings saws can be connected onto the initial cutting ring assembly through seamless interlocking configurations that allow extended cutting lengths for the multi-ringed tubular saw system and multiple extensions may be inserted between the drive elements and the cutting edge elements for any of the configurations. Each extension can be configured to connect to the hole-saw cutting element below and the holding plate drive mechanism above.

The range in size of multi-cylindrical ringed tubular saws is determined by the user. The cylindrical ring saws may be ten (10) feet or more in diameter or may be incremented down to ten (10) microns or smaller. The sizes of the multiple hole-saws in this mechanism are determined by the needs and outcomes as required by the user.

Due to variations in size requirements for product outcomes, variations in the materials used in the cylindrical ring saws, variations in sizes of the cylindrical ring saws, variations in the lengths of cylindrical saws for any given requirement and other related variables are possible.

Motive Force

A motive force is provided for the present embodiments to generate a rotational force to allow the cutters to cut or polish the workpiece or substrate. This can be an electrical motor or other type of motive force, including manually, sized to provide sufficient torque for cutting or polishing. In a simple form, the motive force and just be switched on and off for activation. According to other approaches, a process can be employed to control the motive force to provide clockwise and counterclockwise rotation and even rotate in incremental steps (such as predetermined amount of rotation in any direction). For example, and not by way of limitation, the rotation can be a predetermined number of revolutions or degrees in one direction, then reversing by a predetermined number of revolutions or degrees in the opposite direction (creating a washing machine sequence).

Mounting Platter

The motive force in its simplest application can provide rotational force directly to a cutter. Nevertheless, to provide greater flexibility to product outcomes, one approach of the present embodiments the motive force provides rotation to a base plate, which in turn allows mounting of various and a plurality of cutters, extensions, polishers and the like. In a preferred embodiment, the base plate (or mounting plate or mounting platter) is configured to allow one or more cuts of different diameters through the workpiece. Accordingly, the present disclosure provides for a multi-ringed tubular saw system that utilizes mounting plate mechanisms to secure one or more cylindrical shaped hole-saws or their extensions in a fixed or adjustable fashion. Many types of exemplary mounting plate 68 are shown in the figures. The mounting platter can secure the cylindrical ring(s) in fixed position and allow the cutters to work.

According to one approach, fixed plates have slots with specific predetermined spacing to facilitate securing locking pins/tabs extending from a fixed number of cylindrical saws of specific diameters and thicknesses with registries to repetitively cut substrates into specific sizes. These plate and cylindrical couplings will facilitate rigid turning of the ring saw device to meet user registries for product outcomes. These fixed plate designs are not limited according to any dimension and are intended to facilitate user determinations of specificity. The cylindrical saws can be affixed to the plates according to user/substrate requirements.

According to yet another approach, rod/slot securing of cylindrical ring saws with slot designs ranging from round through any geometric shape that fits securely/complimentary through the partnered/targeted cylindrical saws. This coupling method allows multiple cylindrical saws to be driven for cutting substrates as required. This will facilitate rigid turning of the device to meet user registries for product outcomes. The varied ranges of multiple numbers of cylindrical saws will be such that the user may utilize the same plate to create multiple ranges of substrate product outcomes of varied wall thicknesses and diameters. These variable plate designs may range in size.

Variations include but are not limited to, spindle locking arms, plate locking processes, conical plate locking processes, cross bolt processes, honeycombed plates; arrow or V patterns; and any other design pattern format in the locking/securing plate mechanism that allows the two or more cylindrical ring saws to spin simultaneously and complete the intended cutting action to create tubular products.

Extensions

Due to the expansive range of variations users may require in utilizing this tool, various extension pieces may be required for locking/securing the plate mechanisms to the cylindrical ring-saw in interchangeable and variable applications. The variations in design are due to the range of sizing parameters for each set of joined tubular ring saws as well as the due to the variation in requirements for the substrate that is to be cut.

The length of the cylindrical ring saw extensions can be any desired length and limited only by the feasibility of production. According to one approach, the base plate and cylindrical slot drive elements for any of the configurations can also be held as fixed members and allow cylindrical saw extensions to be inserted between the drive elements and the cutting edge elements.

In a preferred embodiment, extensions are provided to mount the base plate to the cutters. One approach provides use of extensions the locking tabs to attach to the base plate and the cylindrical ring-saws cutters of any matching diameter to create additional length to reach any desired cut depth. The extension design tab concept is such that the lengthening extends the cutting edge member until the cutting edge is beyond the substrate being cut or at least to the desired depth of the cut. Multiple lengths of extension rings may be added as needed.

Locking tabs, such as shown in the figures, provide the user with easy attachment of the extensions to the base plate and to the cutters and also provides seamless insertion mechanisms, such as mechanism minimizing grooving of the substrate beyond the thickness of the cutter. As will be described, the locking mechanisms for the hole-saws and the extensions allow multiple attachment points along continuous slide openings on the base pate. A multi-cylindrical tubular saw design allows the motive force to operate the saws in clockwise and counter-clockwise rotations at any stage of the cutting process, therefore variations of the locking/securing tab mechanisms facilitate dual rotation of the multi-cylindrical ring saws.

Cutters (Ring-Saws)

The ring saws of the present embodiments can have locking/securing tab mechanisms that include but may not be limited to: cylindrical tips that may clip into or otherwise be secured into cylindrical holes in the locking/securing plate mechanism; ring assemblies that clip onto or are otherwise secured onto spindle versions of the locking/securing plate mechanism; arrow (or other geometric shapes) that facilitate bidirectional spin action with minimal positional distortion.

In a preferred embodiment, a ring-saw cutting edge is mountable to the motive force, the mounting platter, or to an extension piece mounted to the motive force of the mounting platter. The interlocking tubular structures are connected, as necessary, through various seamless interlocking configurations to allow extended cutting lengths for the tubular saw mechanism. It is noted that where the ring-saw is attached to an extension, the mounting mechanism may not exceed the thickness of hole created by the cutting surface. This allows the cutter to continue through a workpiece by allowing the mounted extension into the hole created by the ring-saw.

The ring-saw cutters can be attached to the base plate, or most preferable, the extensions, the cylindrical hole saw or separate apparatus in this system will have an extension blade that holds in alignment with the saw as it cuts through the work piece to a desired length. The user may extend the blade(s) through the workpiece through hydraulic or other mechanisms to extend away from the cylindrical hole saw to the interior or exterior of the cylinder to cut a groove in brittle substrates such as stone or granite or to create a complete severing of wood or similar substrate such that the tube or central dowel is circumcised and thereby made removable.

According to alternate embodiments, substrate or workpiece compositions can determine a variety of cutting devices and processes. Various embodiments can include: diamond crusted steel, columns of composite abrasives, hardened steel, water jet, laser, EDM (Electro Discharge Machining), pulse, vibration, combinations thereof, and the like.

Figure 46:
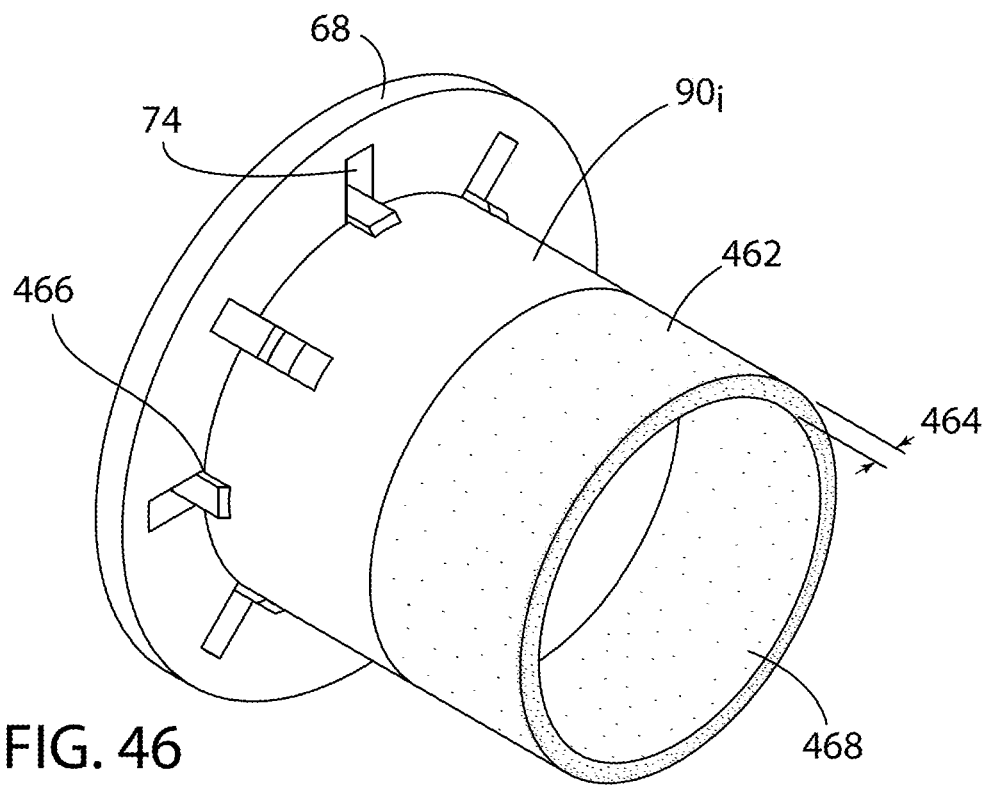
FIG. 46 illustrates a ring cutting assembly of present embodiments according to another approach.

In addition to cylindrical rings saws being made of diamond encrusted metallic materials such as steel, such as one shown in FIG. 46. Cylindrical ring saws can also be developed using composite material by setting abrasive grains with a bond of rubber, shellac, resin or other commonly used abrasive bonding materials into the desired diameter cylindrical ring forms. Reinforced composite cylindrical ring saws can have filaments added throughout, such as fiberglass, for additional strength. Common abrasive materials include but are not limited to aluminum oxide, silicon carbide, CBN, and diamond. The user can choose from very coarse to fine grade, or corresponding grit, depending on the substrate material being worked and the size of the cut.

Stabilizers and Guides

It is an important that the assembly be held firmly in place so that the ring saws are able to engage the substrate at the desired target parameters. The tubular saw can also be utilized as a device that lowers onto the substrate or it can be set upon a holding platform and the substrate can be lowered onto it.

According to one approach, roller guides can be positioned at one or more points along the shaft of the rotating portions of the saw, based on length and balance needs. In some embodiments, a holding platform and mechanism for primary substrate can be provided as well as a catch platform for a tubular form product from the present embodiments.

The stabilizer device can be anchored independently from the tubular saw. It may be attached to the substrate or may be independently supported. The function of this device is to provide rigid stabilizer arms with end spinners or ball bearings that allow the saw to spin freely but also dampen the vibration and wobbling that occurs in objects that spin. This guide mechanism will facilitate the tubular saw cutting the substrate at the intended specifications with minimal distortion due to vibration.

Transverse Cuts

Transverse cuts can be created by use of a specialized ring saw with a hydraulic arm which extends to the interior or exterior wall of the targeted tubular or dowel structure that has been created. The hydraulic arm may have cutting mechanisms specific for the workpiece material with the arm devices for wood having saw teeth and the arm devices for stone having grit coating to etch the stone sufficiently to create a clean break at the desired location. Other mechanism are possible under other approaches within the scope of the present embodiments.

Other Optional Features

Other optional features of the present embodiments may include sander systems and polishers for finishing interior and exterior surfaces. An interior lathe may be created to create holding grooves or other interior etching. Conical or Tapered Cutter mechanism for shaping interior and exterior tubular surfaces can facilitate connecting tubular products. Halving or sagittal saw mechanism to cut tubes on linear axis creating half tube segments or other dimensional sections. Linear cutting tubular product to create circular products of varying lengths from the tubular structure. Side Shaper planer mechanism for creating geometric shapes from the cylindrical shape.

A bladder sander system and holder platforms can also be provided. This device can serve as a platform base that allows substrates to be cut with the tubular saw and will allow separation of the resulting tubular and dowel components. The targeted tubular substrate can drop onto a catch plane that holds it in place when the saw, and parent substrate are removed. In some of the present embodiments, for example, 56-62, expandable bladders can be used to grip a work piece for extraction.

Blade edge designs can be developed with unique specificity that facilitate optimum cutting for various substrates. Saw teeth designs for wood can vary according to target objectives as they will for stone, granite, lava rock, ice or other substrates. In stone tubular saws, weeper lines, channels, and cut gaps to allow water to penetrate to the core cutting lines and minimize blade fatigue can be provided. Relief etchers, router type assembly with guide plates for cutting on curved surfaces and pattern replicator for relief duplication can also be provided.

Additional features can include: exterior plate locks that are flat, concave and/or convex; quick click or screw lock; interior stem locks; central drill tip guide; place guide with locking alignment; LED Light guide; exterior plate locks; holds for substrate to be held in place laterally and on an elevated plane that allows the saws to fully cut through the substrate An additional embodiment can be to have two or more cylindrical ring saw systems cutting simultaneously on two or more different axis into any given substrate simultaneously like a multi-headed electric razor positioned over and cutting a given substrate. In this instance independent cutters can be placed on a gimbaled framework.

Figure Description

Figure 35:
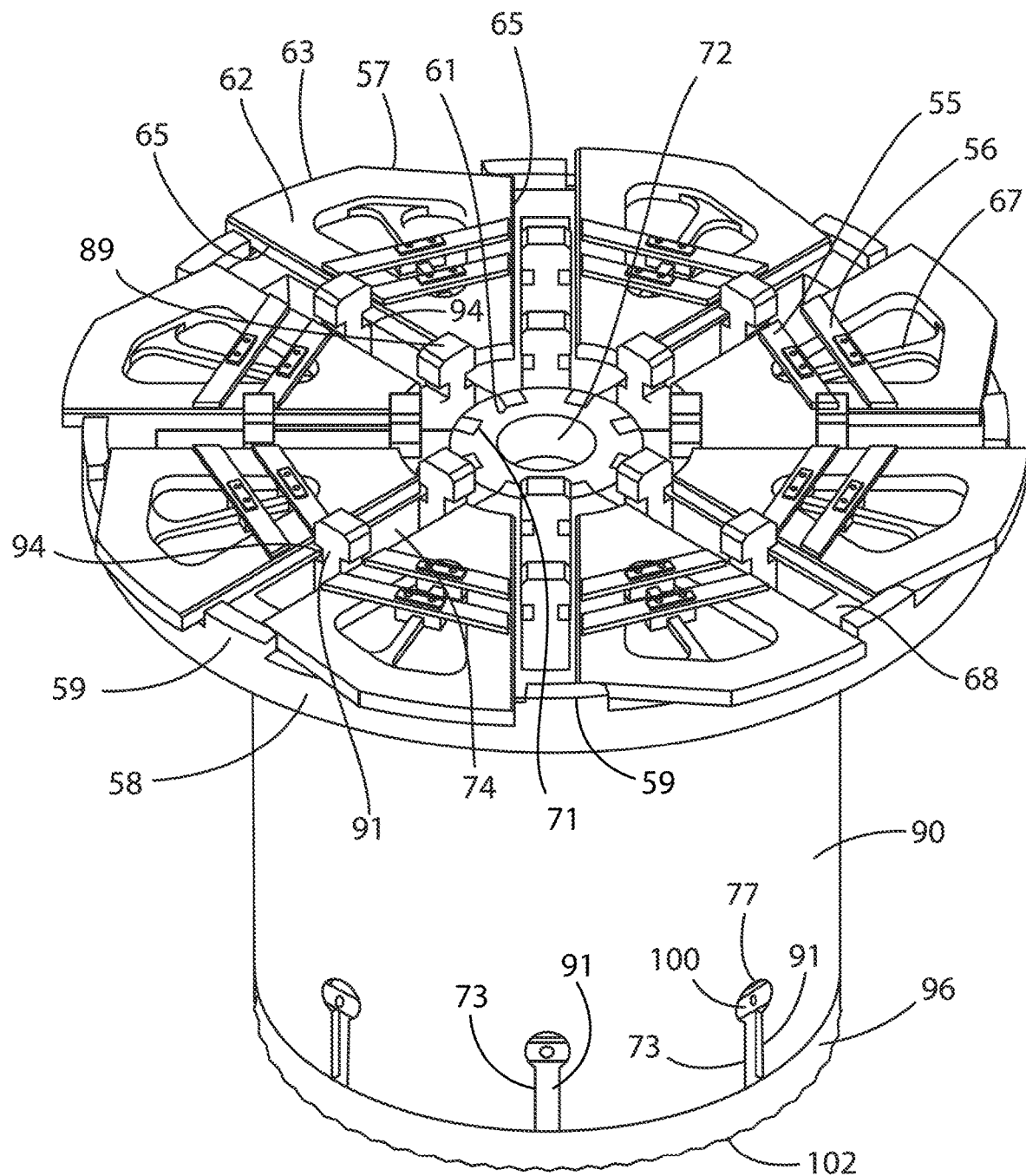
FIG. 35 illustrates a perspective side view of an assembled platter 68 in an unlocked position, extension 90 and cutting ring 96 assembly in accordance with a first embodiment with two cutting rings.
Figure 68:
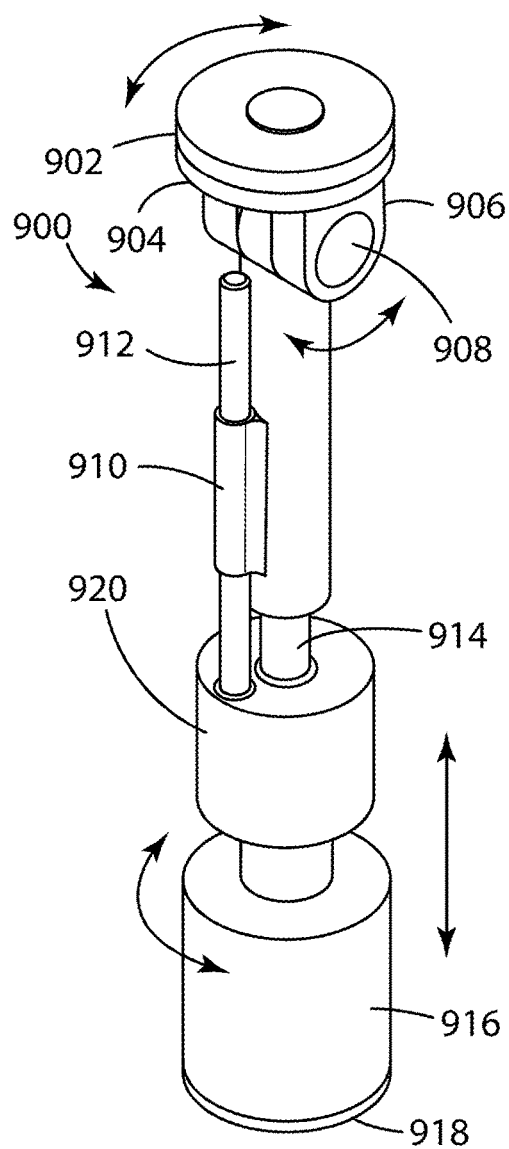
FIG. 68 illustrates a perspective view of a dual swivel cutter mount of present embodiments according to another approach.

Exemplary hole-saw assemblies and components described herein are depicted in FIGS. 1-68. FIG. 1 illustrates an exploded perspective view of a hole-saw assembly in accordance with a first embodiment, which is also shown in various additional specific or clarifying detail in FIGS. 2-14, 35-38 and 50-55. As shown, a motive force carriage assembly 51 may have a motive force 50 (electric motor shown), drives assembly 51 via drive shaft 52, guided by a drive shaft guide 54 and rotational roller/ball bearing 49. Motive force carriage 51 assembly can have motive force advance (ways) 55 on motive force carriage 53 to move the motive force 50 and driveshaft 52 as it advances through a workpiece. As show, the distal end (relative to the motive force) of drive shaft 52 mount to a cutter. One way to do this could be by a threaded portion 79 to mount drive shaft 52 to a slotted platter 68. To better secure slotted platter to the drive shaft, such as against the twisting torque of the motive force, retention torque ring 60 mounted to the drive shaft (by extending through and secured to retention torque ring 70 centered bore) can have squared teeth 61 to mate with matching platter squared recesses 71. Squared recesses 71 on platter 68 to mate with matching square teeth 61 on retention torque ring 60 (See specifically, FIG. 35).

Components of a slotted platter 68 can include slots 74 to mount, for example, an inner extension ring 80 and/or outer extension ring 90, which at their distal end (relative to the motive force) allows mounting of a cutter, polisher and the like, such as an inner cutter ring 86 and an outer cutter ring 96 respectively shown in FIG. 1.

As will be described herein, a variety of exemplary ways to attach cutters of the present embodiments to the motive force are possible. According to one approach shown in FIGS. 1-7, slotted platter 68 can be mounted to drive shaft 52, via its threaded portion 79, which extends through platter-centered bore 72, and is attached thereon by locking bolt 78 and spacer/washer for locking bolt 76.

Also shown in FIGS. 1-14, 35-38 and 50-55 is one approach to attach cutter/polishers or extenders to slotted platter 68. As shown, inner extension ring 80 can have inner extension ring pins 82 to connect on platter and extension ring pin recess 94 to allow connection to edge 65 of locking pin clips 62 slideably attached to slotted platter 68. Similarly, outer extension ring 90 can have outer extension ring pins 91 (comparable to inner extension ring pins 82) to similarly allow connection to slotted platter 68.

Figure 2:
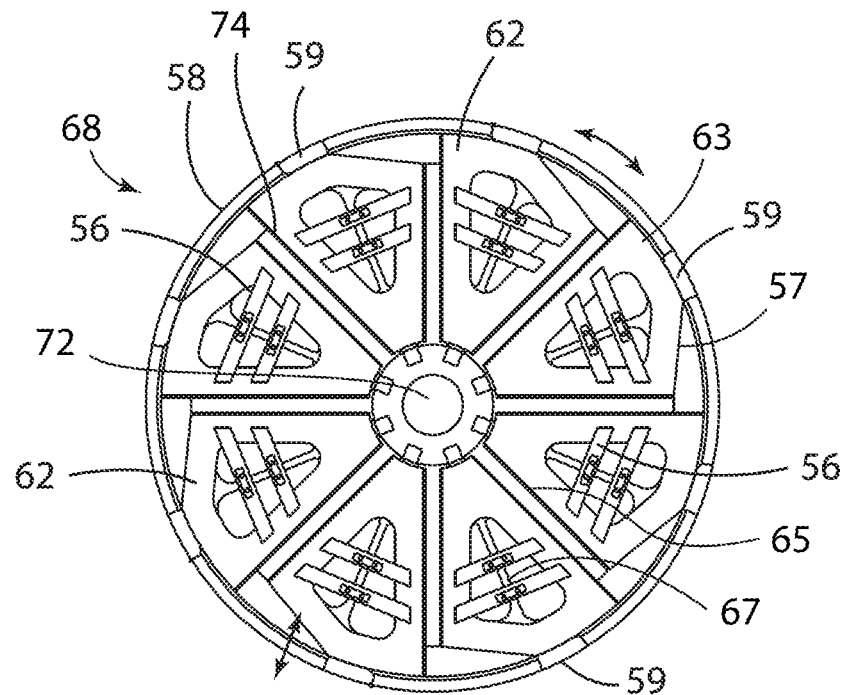
FIG. 2 illustrates a back view (toward motive force) of a slotted platter 68 assembly in accordance with the first embodiment in a locked position.
Figure 3:
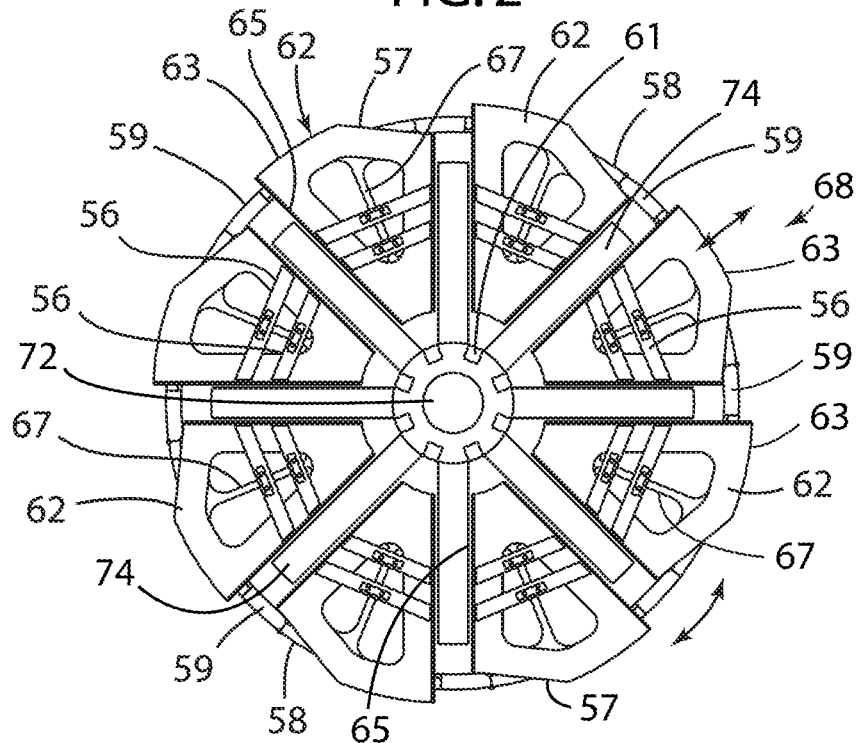
FIG. 3 illustrates a back view (toward motive force) of a slotted platter 68 assembly in accordance with the first embodiment in an unlocked position.
Figure 4:
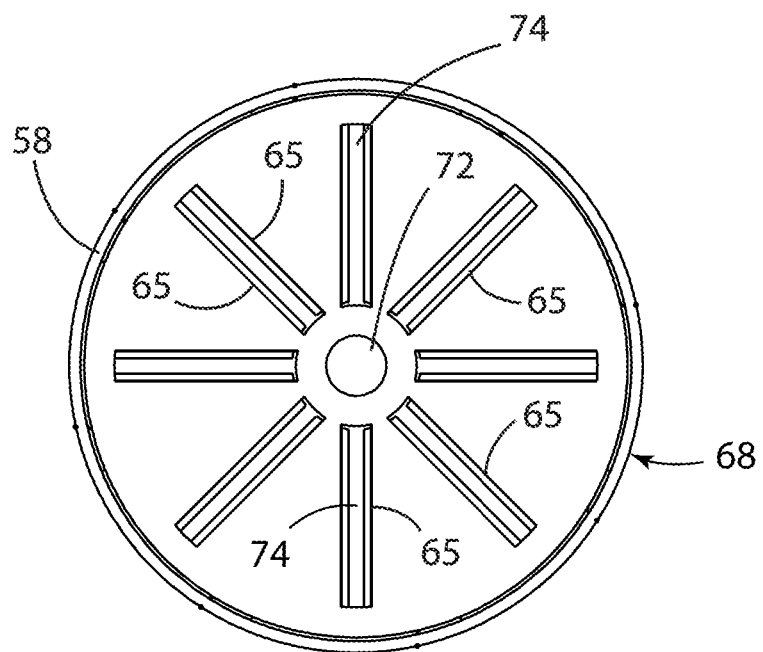
FIG. 4 illustrates a front view (toward work piece) of a slotted platter 68 assembly in accordance with the first embodiment in a locked position.
Figure 5:
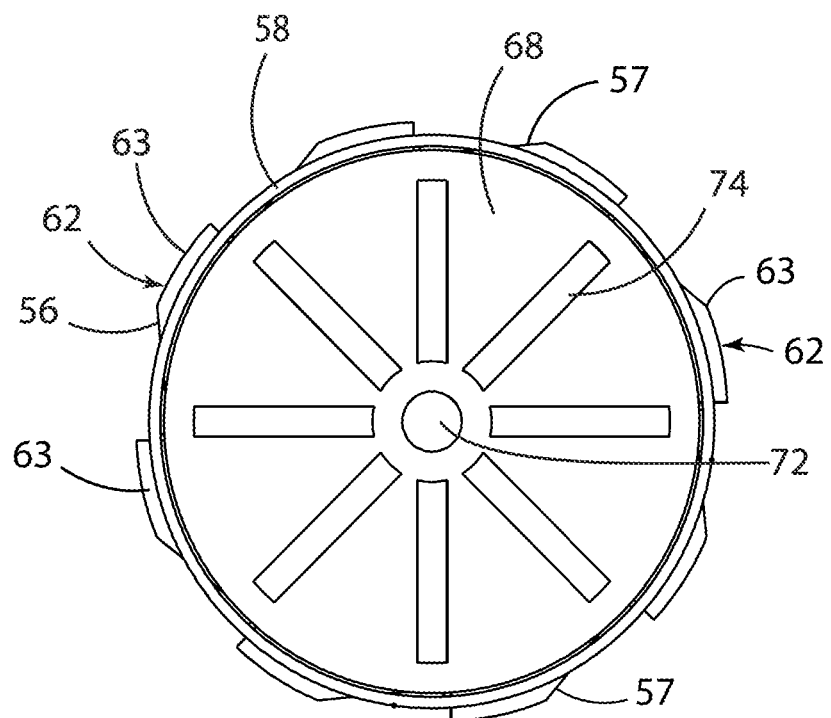
FIG. 5 illustrates a front view (toward work piece) of a slotted platter 68 assembly in accordance with the first embodiment in an unlocked locked position.
Figure 6:
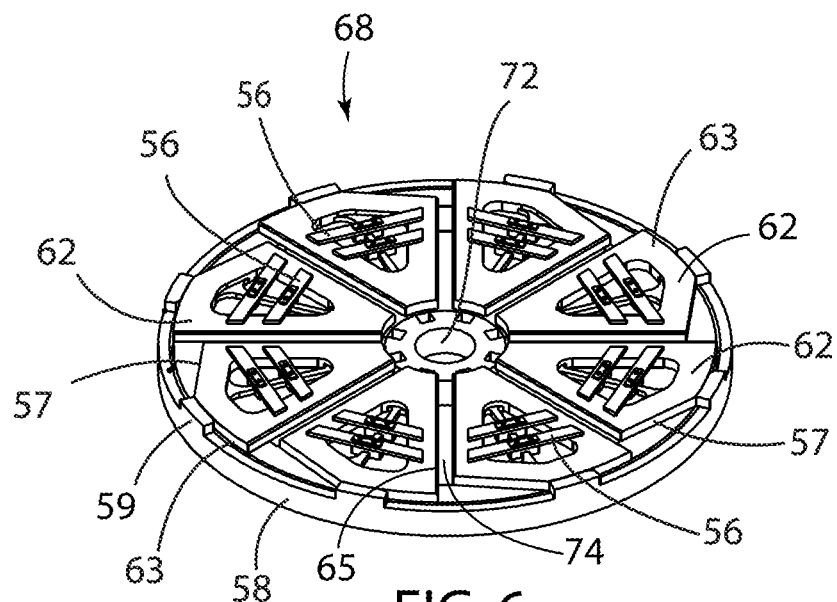
FIG. 6 illustrates a perspective back view of a slotted platter 68 assembly in accordance with the first embodiment in a locked position.
Figure 7:
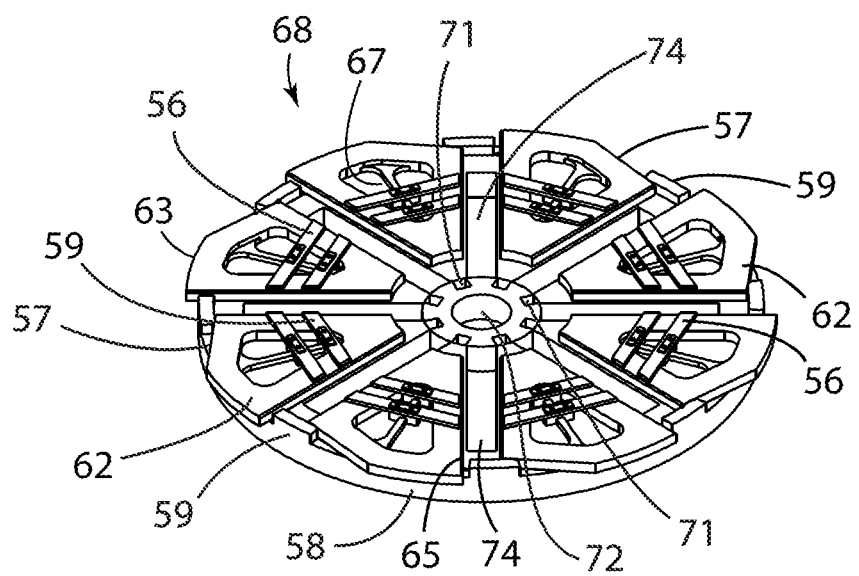
FIG. 7 illustrates a perspective back view of a slotted platter 68 assembly in accordance with the first embodiment in an unlocked position.
Figure 14:
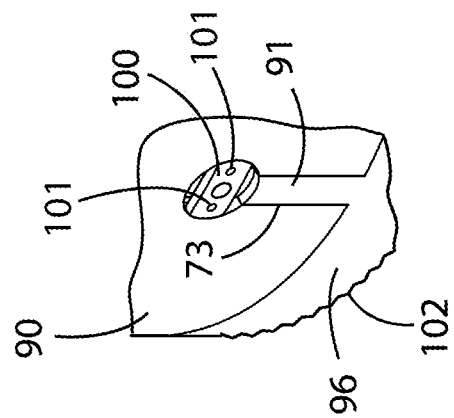
FIG. 14 illustrates a close-up perspective view of area XIV in FIG. 9 a locking disk 100 in a locked position of an assembled extension 90 and cutting ring 96 assembly.
Figure 13:
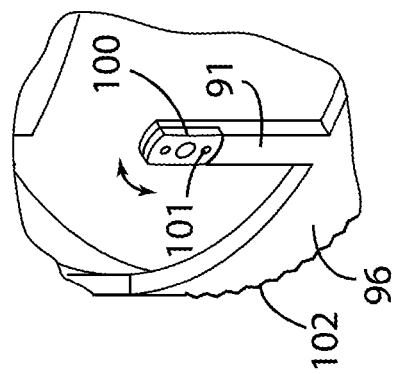
FIG. 13 illustrates a close-up perspective view of area XIII in FIG. 8 of a locking disk 100 in an unlocked position of cutting ring 96 assembly.
Figure 12:
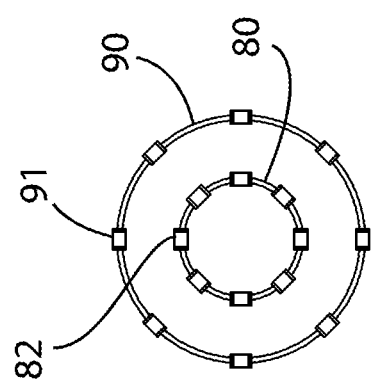
FIG. 12 illustrates an end view (opposite the end where the cutter is attached) of an extension 90 and cutting ring 96 assembly in accordance with a first embodiment with two cutting rings with two cutting rings.
Figure 19:
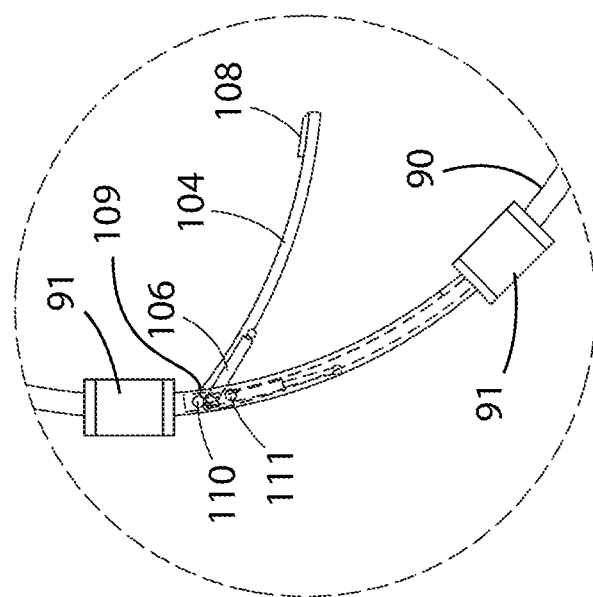
FIG. 19 illustrates a close-up end view of area XIX in FIG. 16 of a locking disk 100 in a locked position of an assembled extension 90 and cutting ring 96 assembly and an optional lateral cutting arm in an extended position.
Figure 18:
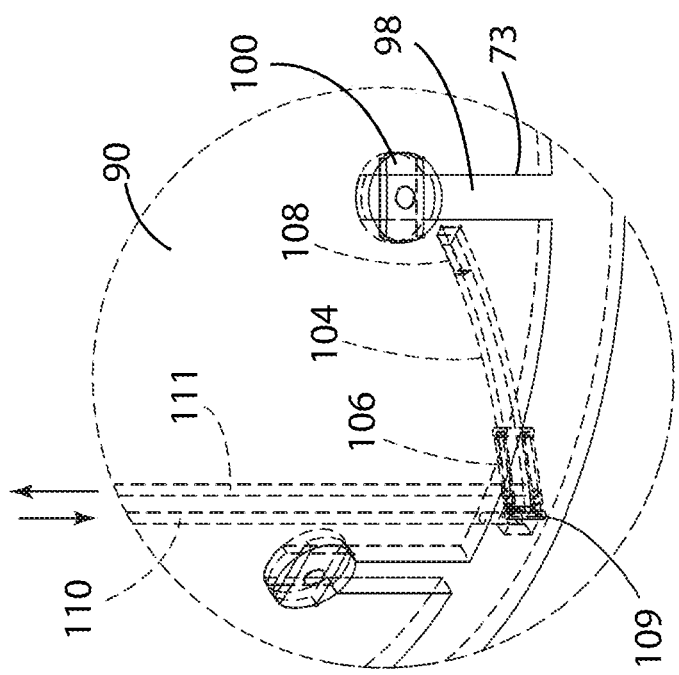
FIG. 18 illustrates a close-up perspective view of area XVIII in FIG. 15 of a locking disk 100 in a locked position of an assembled extension 90 and cutting ring 96 assembly and an optional lateral cutting arm in an extended position.
Figure 20:
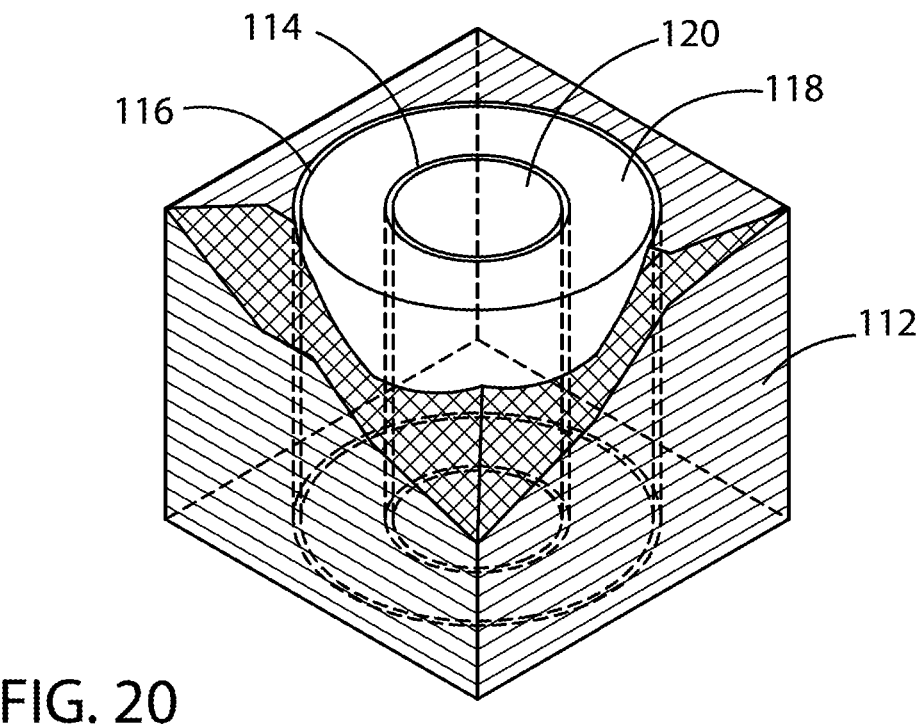
FIG. 20 illustrates a perspective cutaway view of a workpiece after the cutting rings have been have been extended into it.
Figure 21:
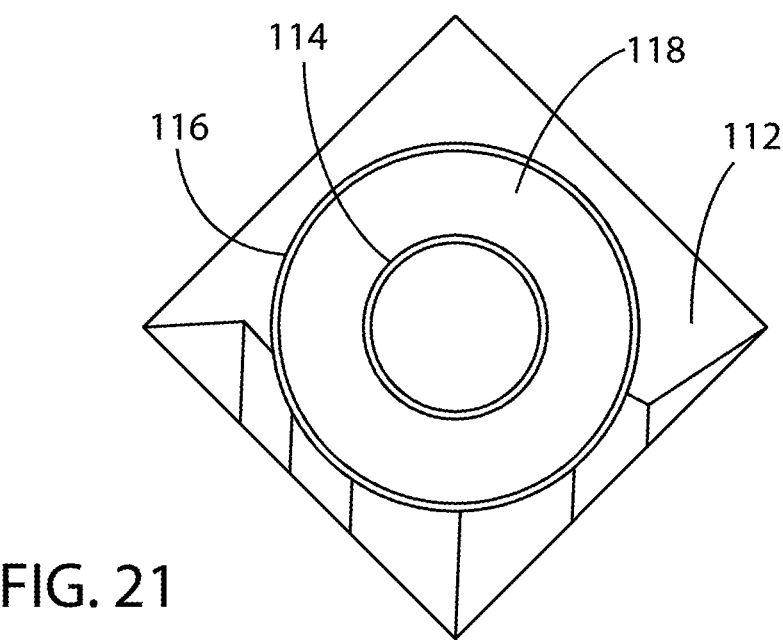
FIG. 21 illustrates an end view of the cut workpiece of FIG. 20.

Locking pin clips 62 can be configured to radially slide inward and outward to uniformly extend into the length of slot 74 on each side as it moves inwardly and extend into pin recess 94 thus mounting the extension rings when in the closed position shown in, for example FIG. 2. Thus, in the closed position of FIG. 2, locking pin clip 62 side edge 65 extends over slots 74 of slotted platter 68 in locked position and into extension ring recesses 94 (outer ring) and 69 (inner ring). In the open position of locking pin clips 62 of FIG. 3, side edge 65 no longer extend over slots 74 of slotted platter 68 thus releasing its connection (mount) to the extension ring pins extension ring recess 94.

Figure 36:
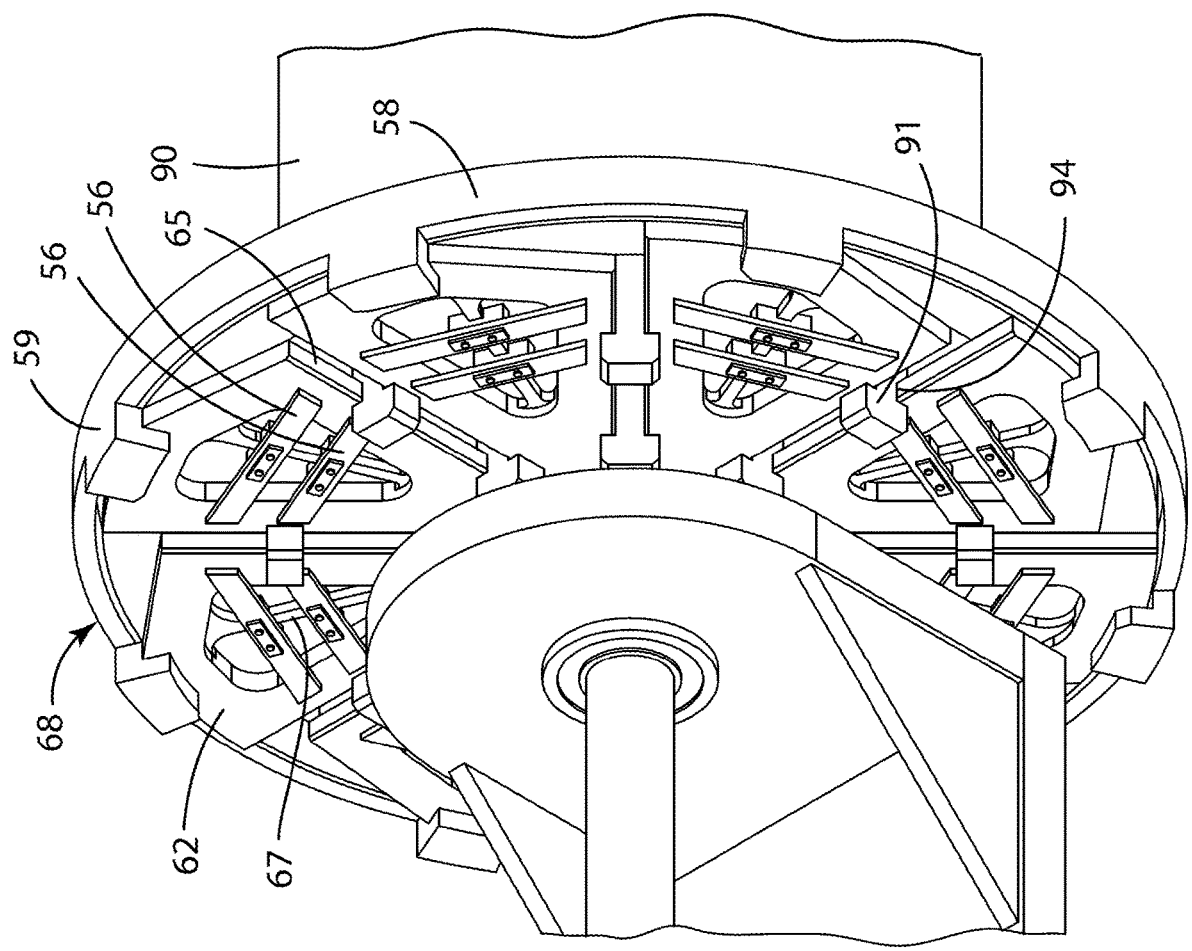
FIG. 36 illustrates a perspective end view of an assembled platter 68 in a locked position, extension 90 and cutting ring 96 assembly in accordance with a first embodiment with two cutting rings and having a rotational motive force, a carriage for the motive force and ways for the carriage to travel.
Figures 37A, 37B:
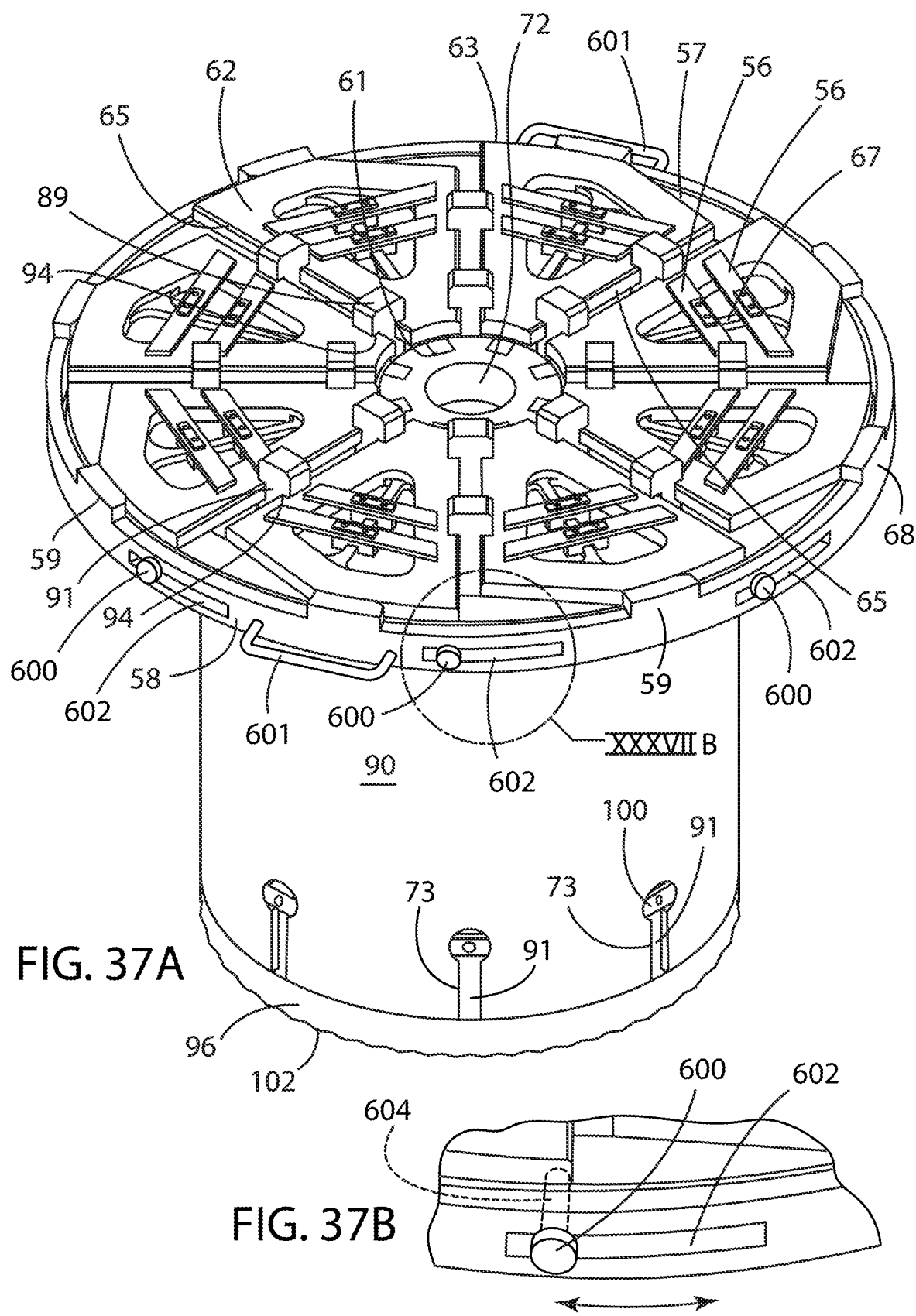
FIG. 37A illustrates a perspective side view of an assembled platter 68 in a locked position, extension 90 and cutting ring 96 assembly in accordance with one approach of the present embodiments.
FIG. 37B illustrates a perspective close up of area XXXVIIB in FIG. 37A of an assembled platter 68 in a locked position, extension 90 and cutting ring 96 assembly in accordance showing retention track of ring 58.

Locking pin clips 62 can have a first opening 64 and second opening 66 separated by locking pin clip guide/strut 67 to slide the pin clip retainers 56, pin clip 56 retainers connected to slotted platter 68 having an opening to receive sliding guide 67. The radially outward edge of locking pin clips 62 can provide an angled edge 57 to engage with stop 59 of retention ring 58 to drive locking pin clips 62 toward the center of the slotted platter 68 as retention ring 58 rotates on the plane relative to slotted platter 68. Thus retention ring 58 rotation engages or releases clips to clasp pins in drive rim via retention ring stop 59 to drive locking pin clips inward when rotated. Locking pin clip top edge 63 keeps locking pin clip 62 locked into position when engaged against retention ring stop 59. Pin clips 56 can be spring loaded to continuously apply a force to urge/push pin clip against ring stop 59 so that as the retention ring 58 is rotated in this instance counterclockwise from a closed position, locking pin clips 62 will be pushed outwardly to allow the mount to the extension ring to be released. Auxiliary springs on screws are optional and presented to show one potential embodiment to lock upon rotating the platter in one direction relative to retention ring 58 and unlocking upon reversing direction of the platter relative to retention ring 58. Ring stop 59 of FIG. 36 shows an alternate approach having a lip to extend over pin clip 62 and a second lip over the back of platter 68 to hold retention ring 58 in place. The spacing and number of first and second lips can be at least three on each side of retention ring 58.

Figure 50:
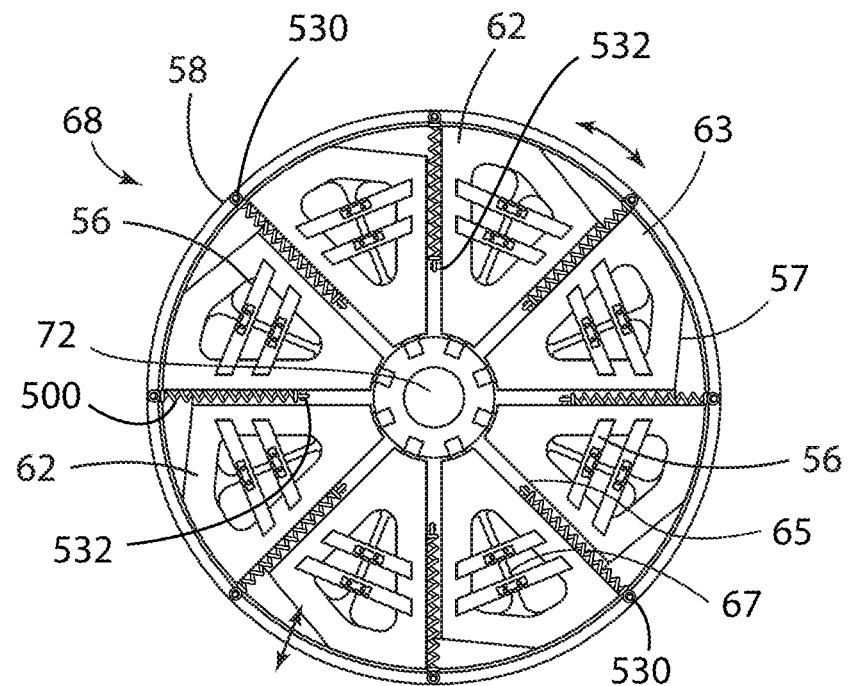
FIG. 50 illustrates a ring cutting assembly of present embodiments according to another approach having spring loaded locking pin clips in a closed position.

FIGS. 50-55 illustrate three approaches to slide locking pin clip 62 from an open to a closed position and from a closed position to an open position. In FIGS. 50 (closed) and 51 (open) an extension spring 500 can be connected to retention ring 58 and pin clip 62. In this embodiment, extension spring 500 stretches as pin clip 62 is forced inwardly during rotation to closed position. During rotation to an open position, the extension spring can retrieve the pin clip and slide it outwardly to allow the release of the extension ring. It is noted that a compression spring configuration would also be possible by attaching the spring so that it compresses as the pin clip slides towards the center.

Figure 52:
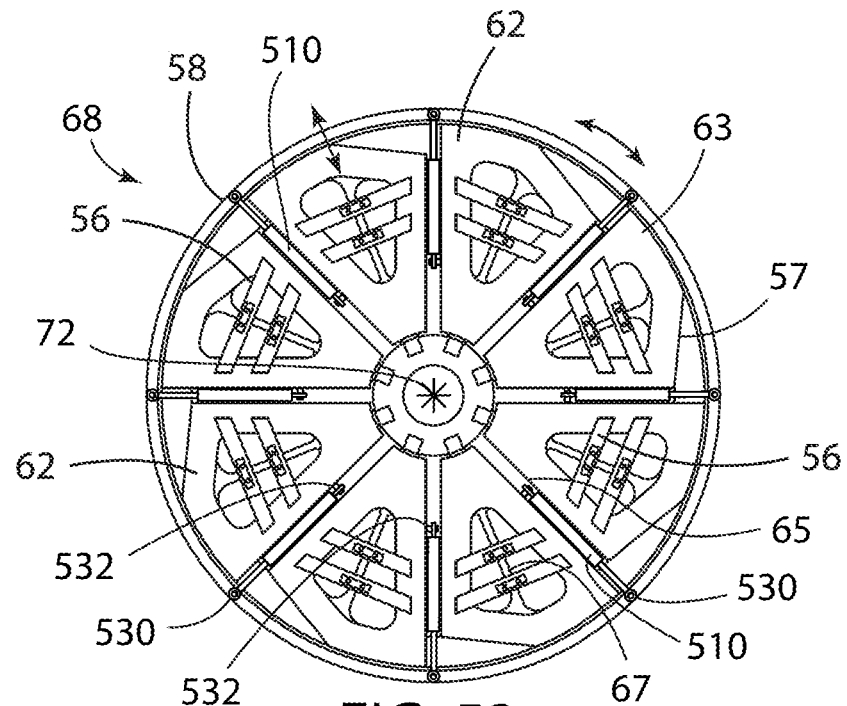
FIG. 52 illustrates a ring cutting assembly of present embodiments according to another approach having hydraulic pistons for locking pin clips in a closed position.
Figure 53:
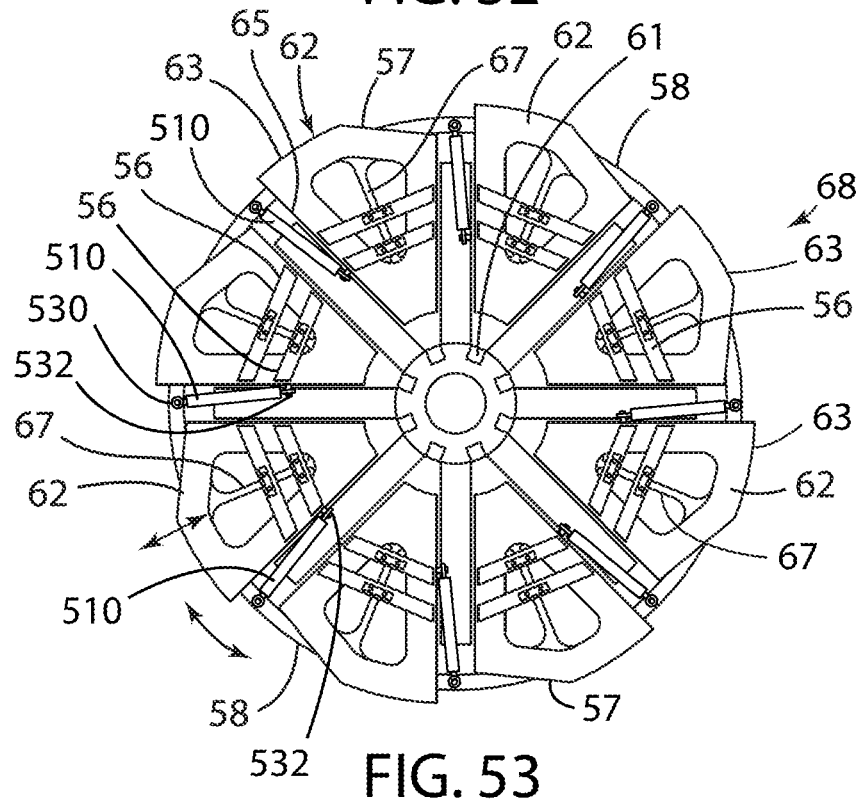
FIG. 53 illustrates a ring cutting assembly of present embodiments according to another approach having hydraulic pistons for locking pin clips in an open position.

FIGS. 52-53 shows another embodiment to extend and retract pin clips 62, which eliminates the need for a rotating retention ring 58 in that a hydraulic mechanism 510 (or solenoid mechanism) can be attached between the slotted platter 68 and the pin clip 62 that can be activated by means known in the art to move pin clips 62 from an open position (FIG. 52) to a closed position (FIG. 53). Slots 74 in platter 68 is configured to receive pin clips 62 The hydraulic pistons 510 would be positioned so as to provide clearance between pin clips 62 in the closed position, while also allowing the extension ring tabs clearance to extend through slot 74. These auxiliary springs and hydraulics are optional.

Figure 54:
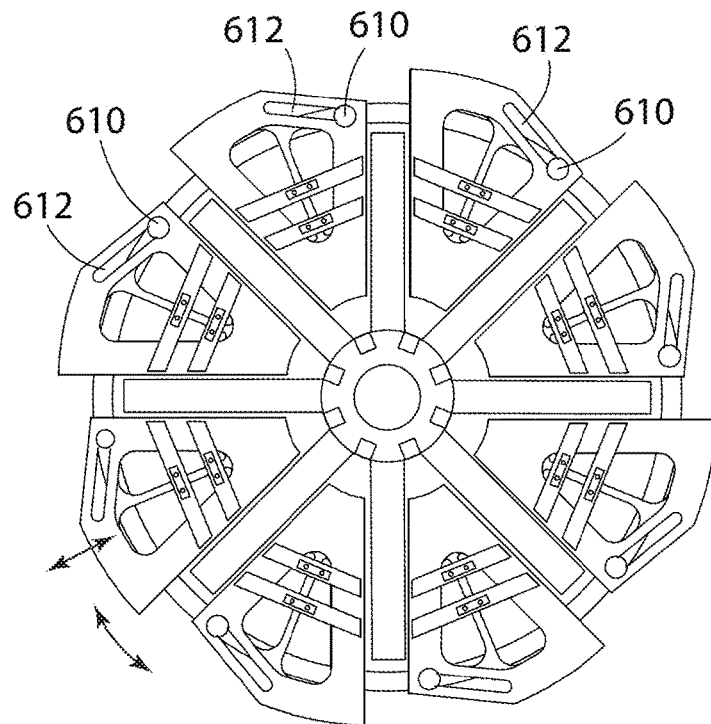
FIG. 54 illustrates a ring cutting assembly of present embodiments according to another approach having a pin within a slot for locking pin clips in a closed position.

FIGS. 54-55 shows another embodiment to extend and retract pin clips 62. In this embodiment pin clips 62 can have a slot 520 through which a pin/pawl 530 of the extension ring extends. As retention ring 58 is rotated, pin 520 travels the path of slot 520, forcing the pin clip 62 to move between an open position (FIG. 54) and a closed positions (FIG. 55). Slip guide pins 530 and slots 520 are optional design to facilitate the locking and unlocking pin clips 62.

Extension rings 80 and 90 may also allow a variety of mechanisms to attach a polishing or cutting ring, such as outer cutting ring 96 outer cutting ring with cutting surface edge 102 and inner cutting ring 86 with cutting surface edge 87. In instances where the extension is to be driven into a workpiece, the attachment mechanism between the cutter and the extension ring in its locked position should not be thicker than the thickness of the desired cut. Otherwise the extension ring could not pass into the cut surface. Accordingly, as shown in the figures (See especially, FIGS. 8-9 and 13-14), extension rings can have slot 73 on outer extension ring 90 (and slot 75 on inner extension ring 80) to allow insertion of tabs 98 and 89 respectively on cutting rings 96 and 86.

Thus, locking disk mounting tab 89 allows locking onto inner extension 80 and locking disk mounting tab 98 allows locking onto outer extension 90. According to the approach as shown, this can be accomplished with rotating locking tabs on each of tabs 89 and 98. To accomplish this type of attachment while maintaining a narrow profile, the present embodiments provide, for example on the outer extension, a recessed portion 77 at the distal end of slot 73 to receive and lock the 90 degree rotational locking disk 100 on tab 98 of cutting ring 96. Recessed portion (receptacle) 84 allows locking disk 88 to rotate into inner extension ring to lock in cutting ring 86 having and inner cutting ring cutting surface edge 87. Locking disk 100 can be rotated with the aid of a key 105 having pins 103 configured to be received within holes 101 on locking disk 100 and grab handle 107.

FIGS. 15-19 and 42-45 show another approach to the present embodiments showing a mechanism disposed within a cutter ring that can allow a lateral cut into a workpiece. As shown in the figures, hydraulic internal cutting/polishing arm 104 (104*i* for external cutting applications) can be actuated by a hydraulic mechanism 106 (having a hydraulic line in 110 and a hydraulic line out 111) for internal cutting arm 104 attached on the cutting ring and the lateral cutting arm 104. At its end point a cutter or polisher 108 for internal cutting arm 104 can be made from a variety of abrasives and cutters surfaces depending on the composition of the workpiece and the type of desired cut or polish for the workpiece. Internal cutting arm 109 can be hingedly attached to the cutting ring by hinge 109. As shown in FIG. 16, the lateral cutting arm 104 in its retracted position must be able to extend through the cut in the work piece from the cutting ring. In an alternate embodiment a cutter 108 and placed on the internal and external face so that a modified cutting arm 104 could swing internally and externally.

FIGS. 20-24 show material applications that can be produced from a workpiece 112 using the current embodiments. As shown work piece 112 can have a cylindrical cut 114 from inner cutter 80 and cylindrical cut 116 from outer cutter 90. These cuts can be used to form a hollow cylinder 118 from work piece 112 and a solid cylinder 120 from work piece 112. A bore 122 can be formed in hollow cylinder 118 having: beveled edges 124 from internal lateral cutter 104 on cutting ring 96 or extension ring 90; a level edge alternate lateral cut 124*i* to allow removal of the column from the workpiece; and/or a beveled edge illustrations 126 from a second internal lateral cutter 104 on cutting ring 96 or extension 90. As shown in FIG. 24 the resultant products can be stacked for any number of constructions desiring a hollow column that can be formed in sections, such as for drainage tunnels vertical retainer walls, vertical gardens geodesic formations and the like. As shown, a finishing tapering of the ends by a lateral cut allows for more efficient joining of the sections. As discussed herein, there are innumerable such applications and materials that could be produced from the present embodiments.

FIGS. 25-34 show alternate embodiments of a platter 68 to allow for variation of points of attachment for a cutting ring or extension. FIGS. 25-28 show a platter 68*i* having threaded holes 130 for accepting threaded pins 132, which would extend from the circular end on extension rigs or cutting rings (not shown for simplicity). Minimally, four pins would be required for each ring, which is shown for example in FIG. 27A and is configured to hold up to 5 rings.

According to another approach in FIGS. 29-30, alignment rods 134 can extend through side bore alignment holes 136 in cutting rings a collar attachments 138. Cutter 80 holes 137 to allow mounting on alignment rods 134 extending from collar 138 on platter 68*iii*.

Figure 31:
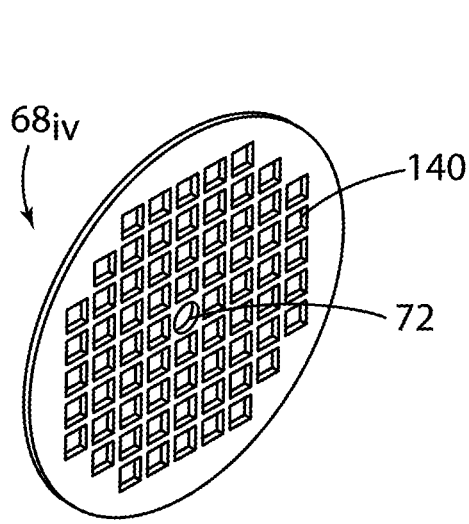
FIG. 31 illustrates a perspective view of another approach to the platter 68*iv*.
Figure 32:
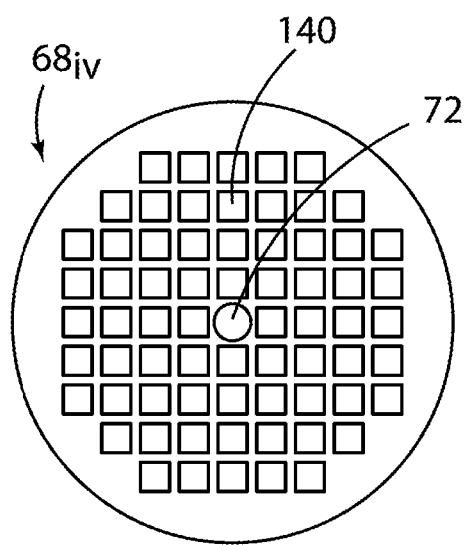
FIG. 32 illustrates an end view of another approach to the platter 68*iv*.
Figure 33:
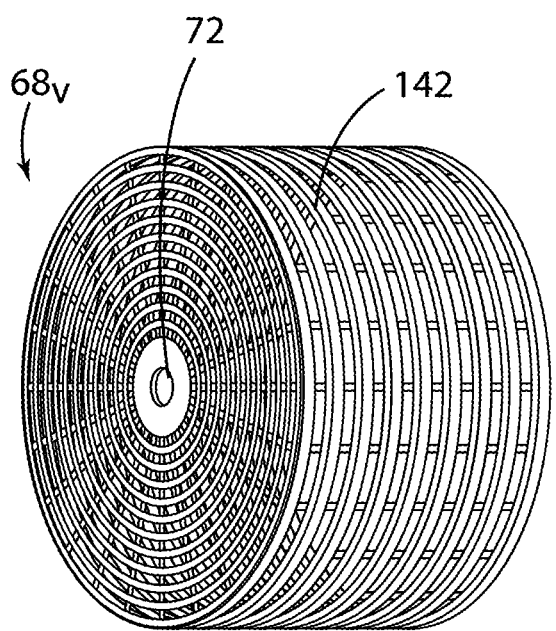
FIG. 33 illustrates a perspective view of another approach to the platter 68*v*.
Figure 34:
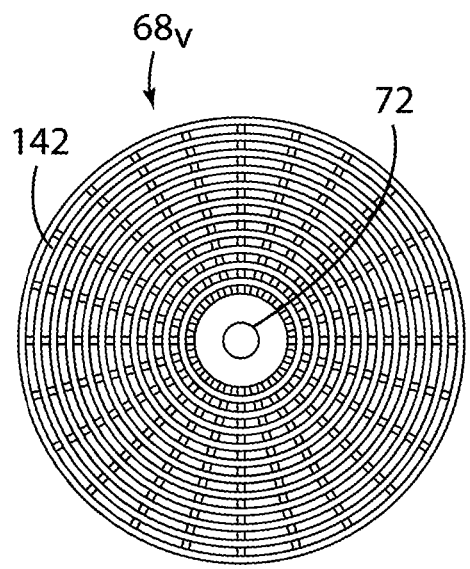
FIG. 34 illustrates an end view of another approach to the platter 68*v*.

According to another approach in FIGS. 31-32, platter 68*iv* grid of holes 140 for accepting threaded pins on extension rigs or cutting rings. According to another approach in FIGS. 33-34, platter 68*v* has a grid of holes 142 for accepting threaded pins on extension rings or cutting rings can be arranged in concentric rings using alignment rods. Other variations are possible within the scope of the present embodiments.

FIG. 39 illustrates another approach to the present embodiments where a workpiece 112 can be secured by a cage 150 to align a cutter (e.g., cutting ring 96 and hold/stabilize workpiece 112. Cage 150 can have, as shown, vertical supports 155 and horizontal supports 154. The vertical supports 155 should be positioned to allow at least four vertical rows of supports 157 and 167 would be needed arrayed in a circular pattern (if four are present in a cross shape. For simplicity only two rows of supports are shown. As shown, the rotating extension ring or drive shaft or cutting ring can be securely and rotatably positioned in place over a secured workpiece 112 by a plurality of support arms 157 which are inwardly and outwardly adjustable to surround the rotating portion having, for exemplary purposes only, a nut 156, a threaded rod 158, a ball bearing housing 160 and a ball bearing 162. Optionally, a spring loaded tip/pilot/drill 164 can be used to start a pilot hole into workpiece 112. Workpiece 112 can be secured by a clamp 167 having spring loaded clamp 166 to hold work piece 112.

Figure 40:
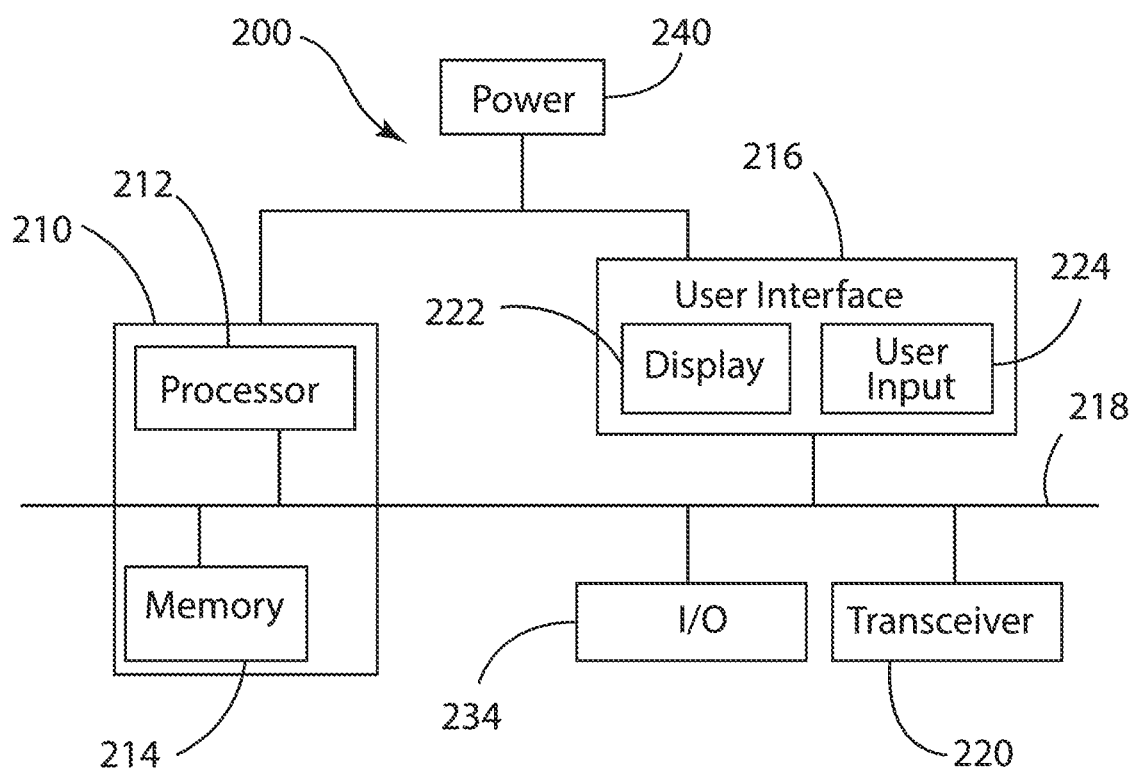
FIG. 40 illustrates an exemplary general system for use in implementing methods, techniques, devices, apparatuses, systems, servers, sources and the like, in accordance with some of the present embodiments.
Figure 44:
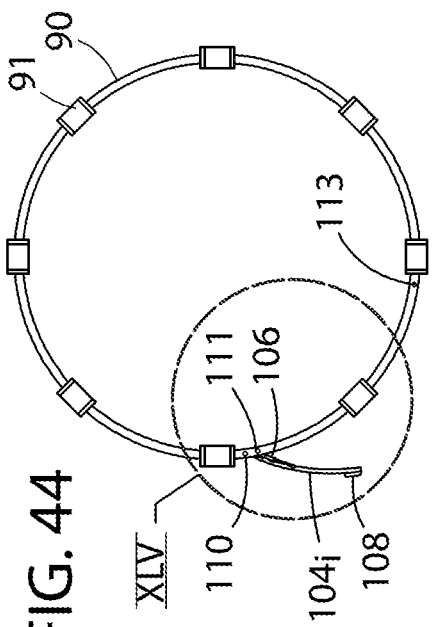
FIG. 44 illustrates an end view of an assembled extension 90 and cutting ring 96 assembly in accordance with another approach with one cutting rings and an optional externally radiating lateral cutting arm in an extended position.
Figure 45:
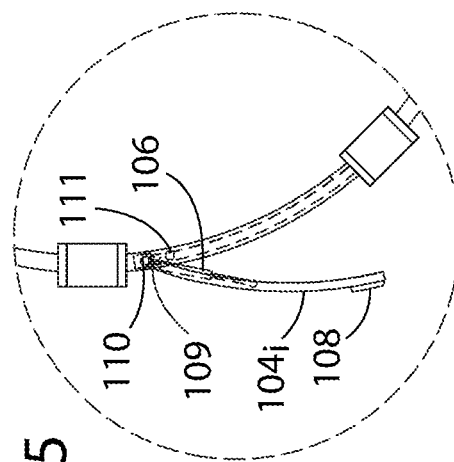
FIG. 45 illustrates a close-up end view of area XLV in FIG. 44 of a locking disk 100 in a locked position of an assembled extension 90 and cutting ring 96 assembly and an optional externally radiating lateral cutting arm in an extended position.
Figure 43:
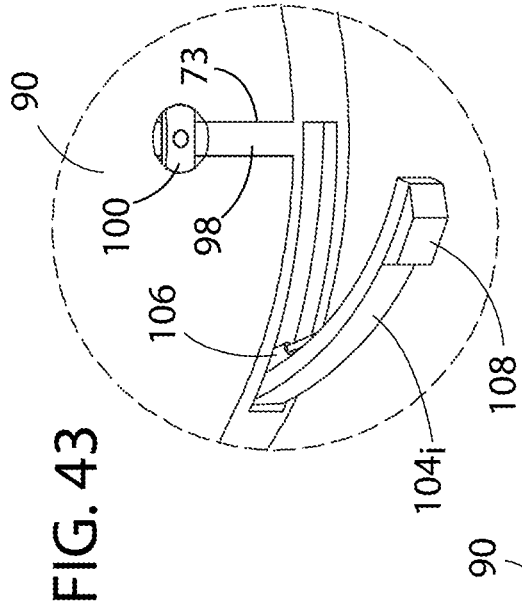
FIG. 43 illustrates a close-up perspective view of area XLIII in FIG. 42 of a locking disk 100 in a locked position of an assembled extension 90 and cutting ring 96 assembly and an optional lateral cutting arm in an extended position.
Figure 42:
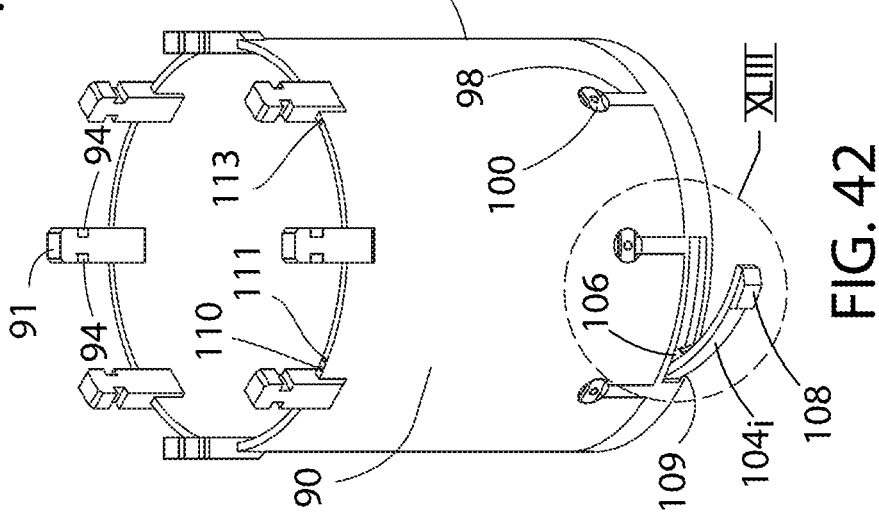
FIG. 42 illustrates a perspective view of an assembled extension 90 and cutting ring 96 assembly in accordance with another approach with one cutting rings and an optional externally radiating lateral cutting arm in an extended position.

Further, the processes, methods, techniques, circuitry, systems, devices, functionality, services, servers, sources and the like described herein may be utilized, implemented and/or run on many different types of devices and/or systems. Referring to FIGS. 38 and 40, there is illustrated an exemplary system 200 that may be used for many such implementations, in accordance with some embodiments. One or more components of the system 200 may be used for implementing any circuitry, system, functionality, apparatus or device mentioned above or below, or parts of such circuitry, functionality, systems, apparatuses or devices, such as for example any of the above or below mentioned computing device, the systems and methods of the present invention, request processing functionality, monitoring functionality, analysis functionality, additionally evaluation functionality and/or other such circuitry, functionality and/or devices. However, the use of the system 200 or any portion thereof is certainly not required.

By way of example, the system 200 may comprise a controller or processor module, memory 214, and one or more communication links, paths, buses or the like 218. Some embodiments may include a user interface 216, and/or a power source or supply 240. The controller 212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller 212 can be part of control circuitry and/or a control system 210, which may be implemented through one or more processors with access to one or more memory 214. The user interface 216 can allow a user to interact with the system 200 and receive information through the system. In some instances, the user interface 216 includes a display 222 and/or one or more user inputs 224, such as a buttons, touch screen, track ball, keyboard, mouse, etc., which can be part of or wired or wirelessly coupled with the system 200.

Typically, the system 200 further includes one or more communication interfaces, ports, transceivers 220 and the like allowing the system 200 to communication over a communication bus, a distributed network, a local network, the Internet, communication link 218, other networks or communication channels with other devices and/or other such communications or combinations thereof. Further the transceiver 220 can be configured for wired, wireless, optical, fiber optical cable or other such communication configurations or combinations of such communications. Some embodiments include one or more input/output (I/O) ports 234 that allow one or more devices to couple with the system 200. The I/O ports can be substantially any relevant port or combinations of ports, such as but not limited to USB, Ethernet, or other such ports.

The system 200 comprises an example of a control and/or processor-based system with the controller 212. Again, the controller 212 can be implemented through one or more processors, controllers, central processing units, logic, software and the like. Further, in some implementations the controller 212 may provide multiprocessor functionality.

The memory 214, which can be accessed by the controller 212, typically includes one or more processor readable and/or computer readable media accessed by at least the controller 212, and can include volatile and/or nonvolatile media, such as RAM, ROM, EEPROM, flash memory and/or other memory technology. Further, the memory 214 is shown as internal to the system 210; however, the memory 214 can be internal, external or a combination of internal and external memory. Similarly, some or all of the memory 214 can be internal, external or a combination of internal and external memory of the controller 212. The external memory can be substantially any relevant memory such as, but not limited to, one or more of flash memory secure digital (SD) card, universal serial bus (USB) stick or drive, other memory cards, hard drive and other such memory or combinations of such memory. The memory 214 can store code, software, executables, scripts, data, content, lists, programming, programs, log or history data, user information and the like.

Some of the present embodiments may be installed on the computing device that receives data transaction requests from the computing device from an interface. The present embodiments can be configured to process data transaction requests received through the interface. Typically, the present embodiments can be communicatively connected to a communication network (e.g., a WAN, LAN, the Internet, etc.), and has the capability of completing the data transaction requests. The present embodiments can communicationally connect with one or more remote servers that are configured to provide information useful in determining the nature of one or more data transaction requests. The present embodiments can further, in some instances, complete a data transaction request through the interface.

Further, in some applications, the remote server is implemented through and/or includes a server cluster containing multiple servers that cooperatively operate and/or communicate to provide analysis functionality. In other instances, the remote server may be implemented in part or fully on personal computer.

The present embodiments may further block access to the network access activity when the network access activity is considered an objectionable or non-compliant activity.

Third party recipients can access one or more reports in a variety of ways including, but not limited to, the report or reports being communicated by one or more of the remote servers, the third party having access to the remote server to request report, and other such methods. A request for a report can include viewing the report while the third party has access to the remote server.

In some implementations, monitoring software is installed on the computing device 1, and in some embodiments is part of the present embodiments. Additionally or alternatively, some or all of the monitoring and/or monitoring program is implemented at a remote server. In some applications, the monitoring software can be voluntarily installed on the computing device by a user. In other instances, the monitoring software can be pre-installed on the computing device.

In some embodiments, network access activity can include, for example, access to one or more of the network activity from a group consisting of http, https, network news transfer protocols, file sharing programs, file transfer protocols, chat room access, peer to peer chats, game protocols, downloads of data, and electronic mail activity. The present embodiments can complete the data transaction request through the interface. In some implementations, the report can be made accessible by a third party recipient (e.g., via direct access through a server, e-mail, periodic reports, text alerts, etc.).

One or more of the embodiments, methods, processes, approaches, and/or techniques described above or below may be implemented in one or more computer programs executable by a processor-based system. By way of example, such a processor based system may comprise the processor based system 200, a computer, a server, a smart phone, a smart watch, a tablet, a laptop, etc. Such a computer program may be used for executing various steps and/or features of the above or below described methods, processes and/or techniques. That is, the computer program may be adapted to cause or configure a processor-based system to execute and achieve the functions and/or functionality described above or below.

As an example, such computer programs may be used for implementing any type of tool or similar utility that uses any one or more of the above or below described embodiments, methods, processes, functionality, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, functionality, approaches, and/or techniques described herein. For example, some embodiments provide one or more computer-readable storage mediums storing one or more computer programs for use with a computer simulation, the one or more computer programs configured to cause a computer and/or processor based system to execute steps comprising: receiving data through the present embodiments that receives data transaction requests, from a local computing device on which the present embodiments are implemented, through an interface; and processing, through the present embodiments, data transaction requests received through said interface. Some embodiments further comprise completing said data transaction requests through the present embodiments that is communicatively connected via a wide area network (WAN) to a remote server which is communicatively connected to the present embodiments; wherein said remote server is configured to provide information useful in determining a nature of said data transaction request. Some embodiments additionally or alternatively comprise monitoring network access activity of the local computing device, including network activity of applications installed on said local computing device; recording results of monitoring said Internet access activity within said remote server. Additionally, some embodiments further comprise completing a data transaction request, by the present embodiments, through an interface. Further, in some instances, the Internet access activity can include access to at least one Internet activity from a group consisting of http, https, network news transfer protocols, file sharing programs, file transfer protocols, chat room access, peer to peer chats, game protocols, downloads of data, and electronic mail activity.

In some embodiments, systems, apparatuses and methods are provided herein useful to obtain product information through scanning. In some embodiments, a method performed by a circuit and/or one or more processors comprises receiving, through an interface, data transaction requests from a local computing device on which the present embodiments are implemented; processing, by the present embodiments, the data transaction requests received through said interface; and completing said data transaction requests through a communication connection with a wide area network (WAN).

Some embodiments further comprise providing information to a third party recipient through processing functionality and/or programming of the present embodiments. Further, some embodiments comprise communicating, through the processing functionality, results of the processing to other portions of the present embodiments. Additionally or alternatively, some embodiments comprise providing, through the processing functionality, information useful in determining a nature of the data transaction request.

Some embodiments further comprise monitoring network access activity of the local computing device through monitoring circuitry and/or functionality of the present embodiments. In some instances, the network access activity comprises network activity of applications installed on the local computing device. Further, some embodiments comprise recording results of monitoring the network access activity within the processing functionality. The network activity comprises, in some embodiments, network activity from one or more of and/or a group consisting of http, https, network news transfer protocols, file sharing programs, file transfer protocols, chat room access, peer to peer chats, game protocols, downloads of data, and electronic mail activity. Further, some embodiments comprise completing the data transaction, by the present embodiments, through the interface.

In some embodiments, one or more of the circuitry and/or functionality may be implemented external to the present embodiments and/or the present embodiments may be implemented through distinct circuitry, processors and/or functionality. For example, in some implementations, the monitoring functionality may reside on the local computing device independent from the present embodiments, and be configured to send and receive data to the present embodiments. Accordingly, the spirit and scope of the present embodiments is not to be limited to the specific embodiments described.

FIG. 41 illustrates an exemplary algorithm for use in implementing material cutting methods, techniques, devices, apparatuses and the like, in accordance with some of the present embodiments and generally show at 300 as one such exemplary system, which starts at 301 and proceeds to a login 302. Data for credentials and cutting instructions is input at step 304 which leads to a command 306 in response to data input, device is activated, wherein the system receives data at step 308, and the system processes data during device activation at step 310. Next the system determines at step 312 whether data input is complete or sufficient and in response to completed instructions can either activate the machine at step 344 or output system status to user at step 322 which loops back to data input at step 304. Next the system at step 316 monitors whether the task is complete. If yes the machine is deactivated and shown on a status screen 318 which then shows data/status output to the user or if still activated orientation and inertia of the cutter at 382.

FIG. 46 illustrates a ring cutting assembly of present embodiments according to another approach. Here cylindrical rings saws being made of diamond encrusted metallic materials such as steel, such as one shown on a diamond encrusted steel or other abrasive surface 462 or interior abrasive surface 468. Cutter thickness 464 can be 1 mm to 2 meters depending on sound engineering principles and the workpiece and desired product. In this embodiment a tab 468 allows attachment to platter 68.

Figure 47:
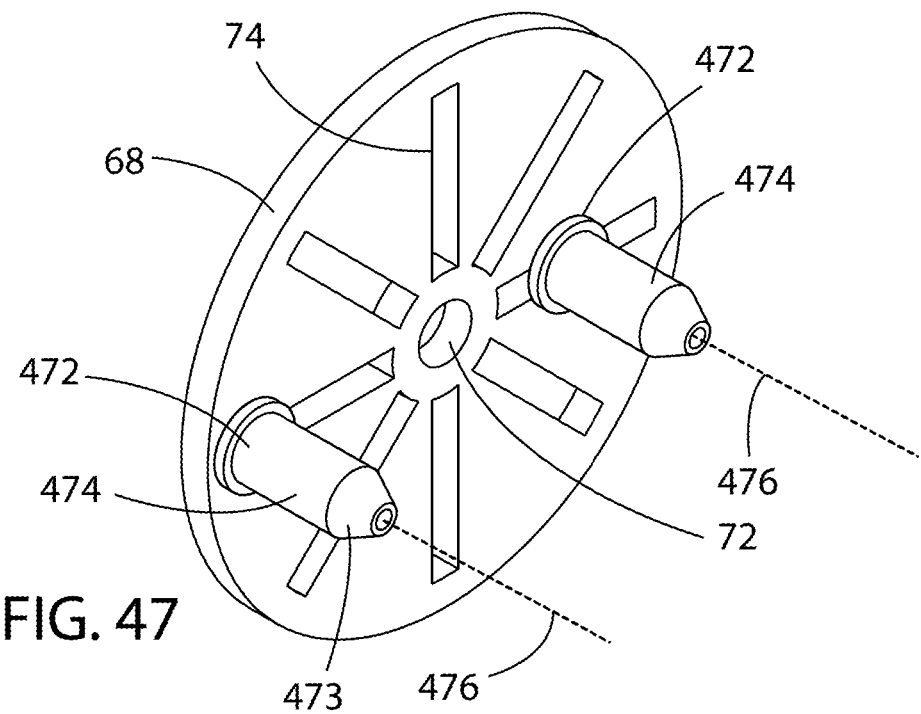
FIG. 47 illustrates a ring cutting assembly of present embodiments according to another approach.

FIG. 47 illustrates a ring cutting assembly of present embodiments according to another approach using high pressure fluids or electron streams to cut a work piece. As shown, this embodiment can have a base 472 of 474 to mount to platter 68; a water jet, EDM or laser cutter 474; a nozzle for cutting medium 473 resulting in a cutting stream of laser light, water or electrons, and the like 476.

Figure 48:
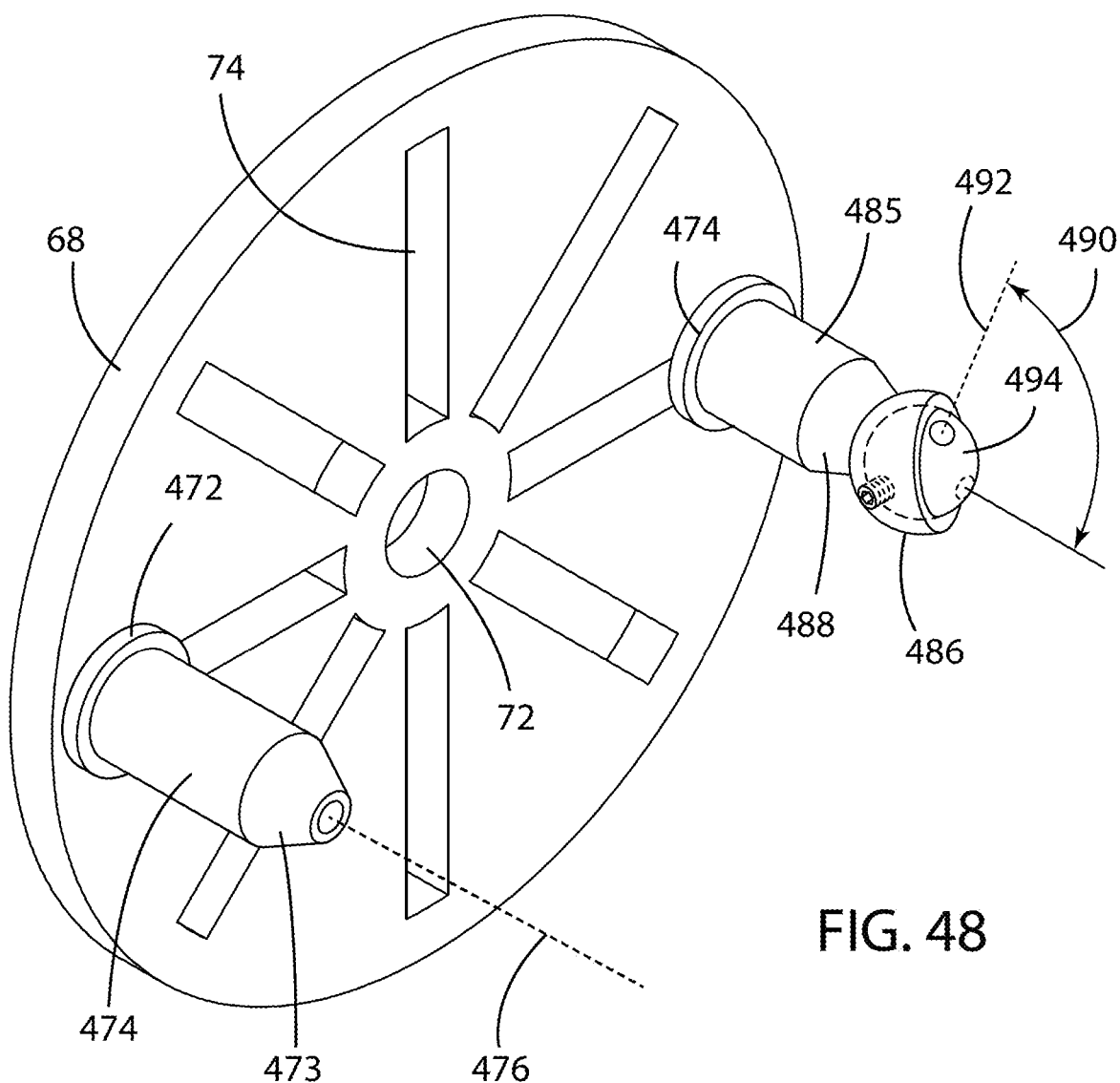
FIG. 48 illustrates a ring cutting assembly of present embodiments according to another approach.

FIG. 48 illustrates a ring cutting assembly of present embodiments according to another approach also using high pressure fluids or electron streams to cut a work piece, but with a modified cutter head with a ball joint to all greater flexibility in the direction of the stream. As shown, this embodiment can have a water jet, EDM or laser cutter with pivoting head 485 mount for swivel discharging head 486; a nozzle for cutting medium 488; a range of swivel (up to 180 degrees) 490; and a swivel head 494 mounted inside of extension 90*ii*.

Figure 49:
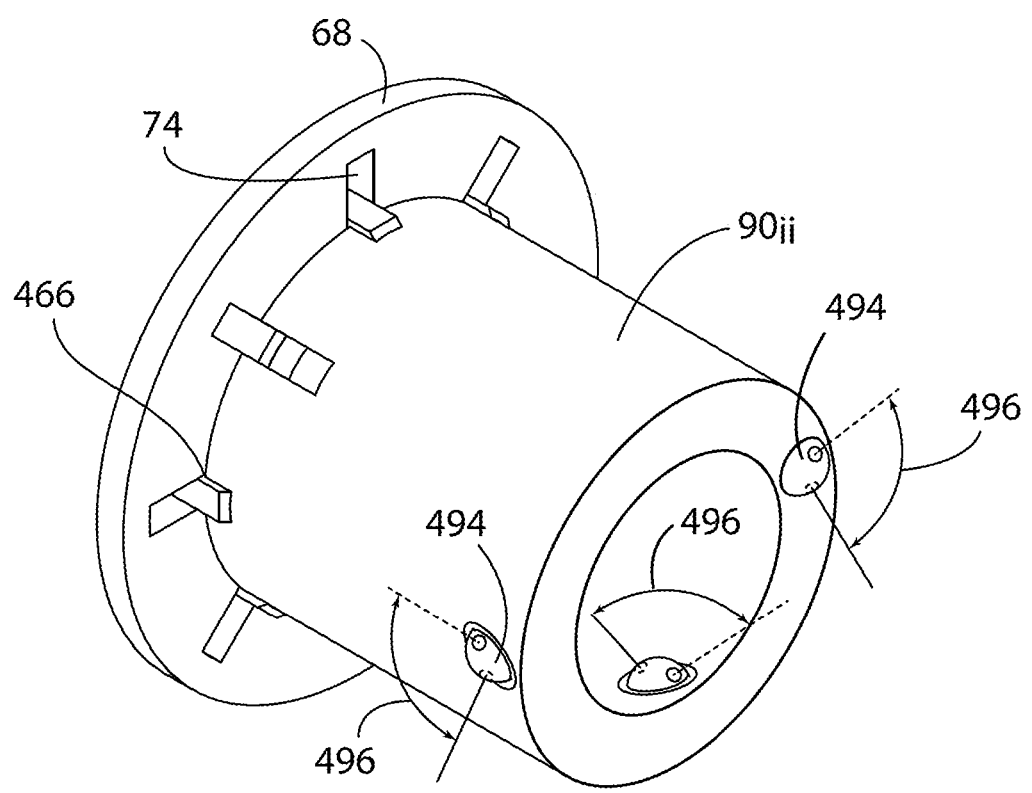
FIG. 49 illustrates a ring cutting assembly of present embodiments according to another approach.

FIG. 49 illustrates a ring cutting assembly of present embodiments according to another approach also using high pressure fluids or electron streams to cut a work piece, but with a modified cutter head with a ball joint to all greater flexibility in the direction of the stream and housed within the extension 90*ii*. Here, range 496 of swivel can be up to 180 degrees.

Figure 51:
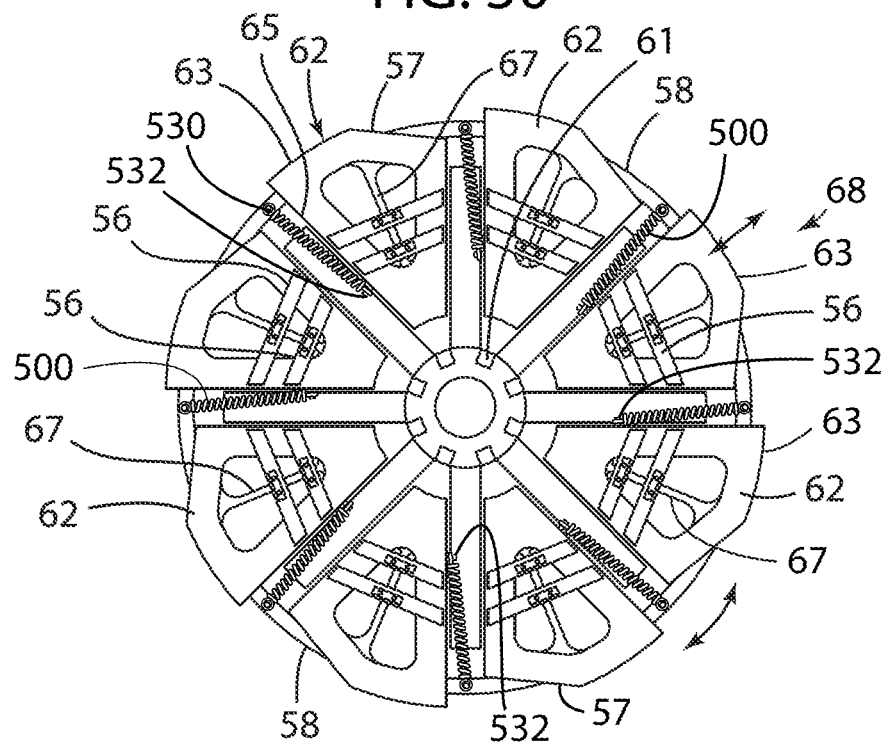
FIG. 51 illustrates a ring cutting assembly of present embodiments according to another approach having spring loaded locking pin clips in an open position.

FIG. 50 illustrates a ring cutting assembly of present embodiments according to another approach having spring loaded locking pin clips in a closed position, while FIG. 51 illustrates a ring cutting assembly of present embodiments according to another approach having spring loaded locking pin clips in an open position. As shown, extension spring 500 is bound to the extension ring by extension ring pin 530 and by locking pin clip pin 532, so that it is stretched as locking pin clip 62 moves inward from the rotation of the retention ring. The retraction force of spring 500 retrieves pin clip 62 when the retention ring is rotated in reverse allowing pin clip 62 to retract.

FIG. 52 illustrates a ring cutting assembly of present embodiments according to another approach having hydraulic pistons for locking pin clips in a closed position, while FIG. 53 illustrates a ring cutting assembly of present embodiments according to another approach having hydraulic pistons for locking pin clips in an open position. In this embodiment, hydraulic piston 510 can drive pin clip 62 inward and outward this removing the need for a rotating retention ring 58. Piston 510 can be mounted to the retention ring 58 by pin 530 and to pin clip 62 by pin 532.

Figure 55A:
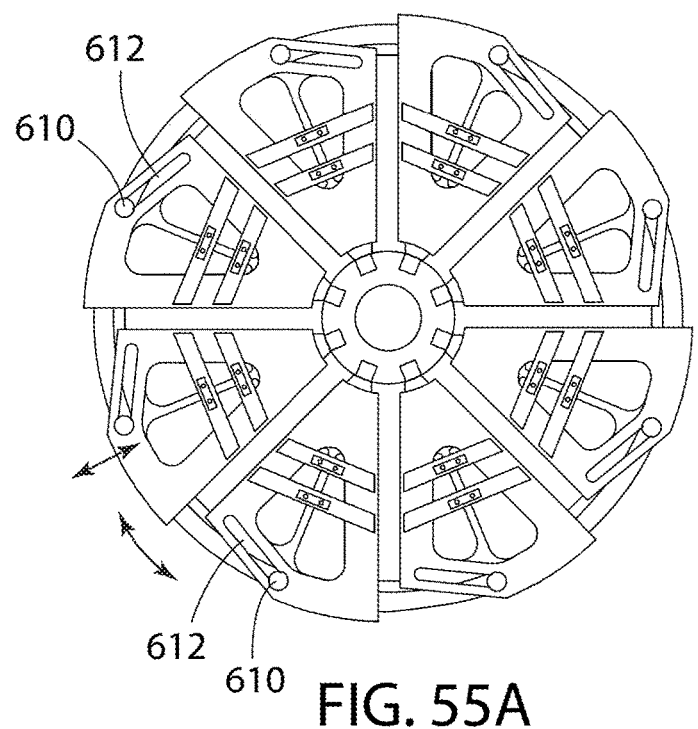
FIG. 55A illustrates a ring cutting assembly of present embodiments according to another approach having a pin within a slot for locking pin clips in an open position.
Figure 55B:
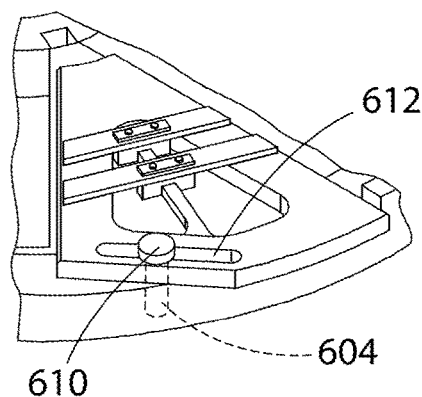
FIG. 55B illustrates close up view of one of the ring cutting assembly of FIG. 55A having a pin within a slot bound in the track by a pin head for locking pin clips in a midway position.

FIG. 54 illustrates a ring cutting assembly of present embodiments according to another approach having a pin within a slot for locking pin clips in a closed position. FIG. 55A illustrates a ring cutting assembly of present embodiments according to another approach having a pin within a slot for locking pin clips in an open position. FIG. 55B illustrates close up view of one of the ring cutting assembly of FIG. 55A having a pin within a slot bound in the track by a pin head for locking pin clips in a midway position. As shown, a retention head 610 having a shaft 604 attached on retention ring 58 and extending through slot 612 can hold pin clip 62 in place while the angle of slot 612 relative to the radius of the retention ring 58 will drive the position of ring clip 62 inward and outward as it rotates relative to platter 68. The angle of the slot is configured to drive pin clip 62 inward far enough to mount the extenders in its inward position and outward enough to allow release of the connector in its outward position. The shaft needs to have a diameter to allow it to slide within the track, while the shaft head diameter must be larger than the width of the track so that pin clips 62 are retained. Similarly FIGS. 37A and B, show an alternate track 602 for retention shaft 604 and head 604 to hold retention ring 58 in place and an optional handle 601 to aid a user to rotate retention ring 58.

Figures 56, 57:
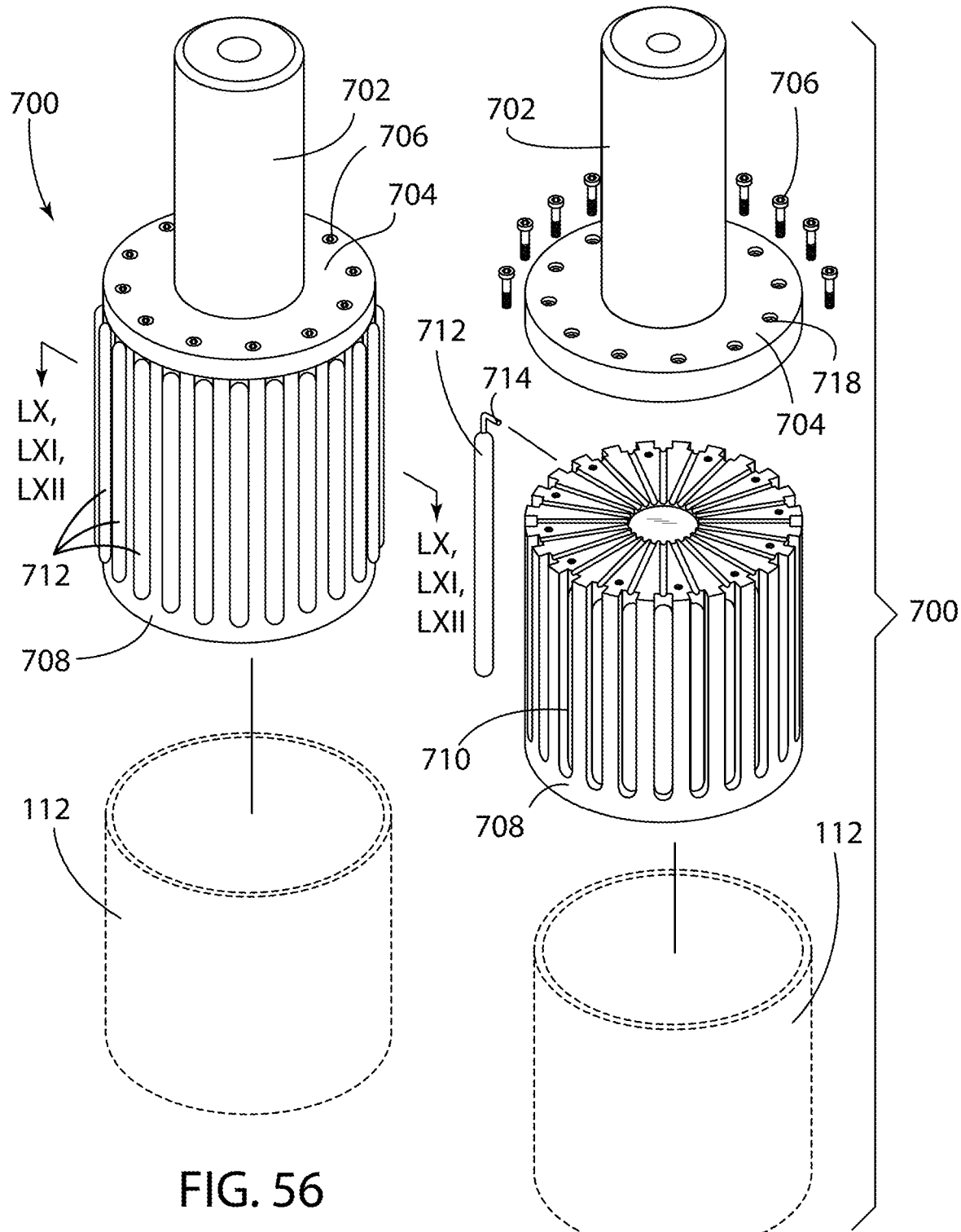
FIG. 56 illustrates a perspective view of a ring lifting or ring polishing assembly of present embodiments according to another approach having workpiece retraction bellows.
FIG. 57 illustrates an exploded view a ring lifting or ring polishing assembly of FIG. 56.

FIGS. 56-62 shown a workpiece retrieval or polishing assembly 700 FIG. 56 illustrates a perspective view of a workpiece 112 lifting or ring polishing assembly of present embodiments according to another approach having workpiece retraction bellows, while FIG. 57 illustrates an exploded view a ring lifting or ring polishing assembly of FIG. 56. As shown in the figures, workpiece retrieval assembly 700 can have: workpiece assembly drive shaft 702; workpiece assembly driveshaft flange 704 to mount housing 708; workpiece assembly bolt 706 to mount flange to housing; workpiece assembly bladder housing 708; workpiece assembly recess 710 to receive bladder 712; workpiece assembly expandable bladder 712; workpiece assembly connection 714 to deliver a compressive force to expand bladder 712; workpiece assembly threaded bore 716 to receive bolt 706; and workpiece assembly flange opening for bolts 718. The compressive force can be from a hydraulic mechanism or compressed gas delivered at a force to expand bladder 712 to a desired dimension to polish a workpiece 112 or to grip it for retrieval.

Figure 58:
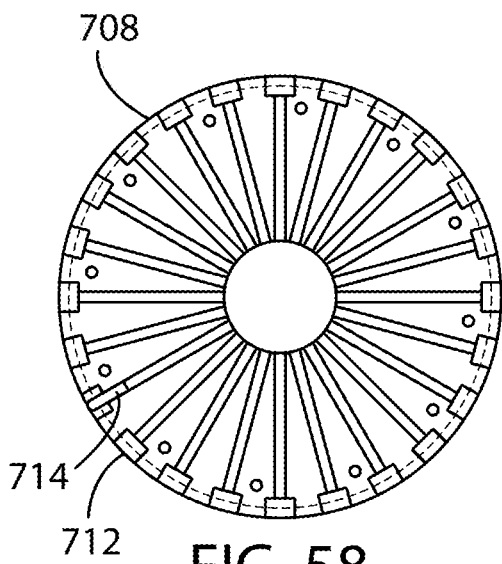
FIG. 58 illustrates a top view of the ring lifting or ring polishing assembly of FIG. 56 with deflated bladders.
Figure 59:
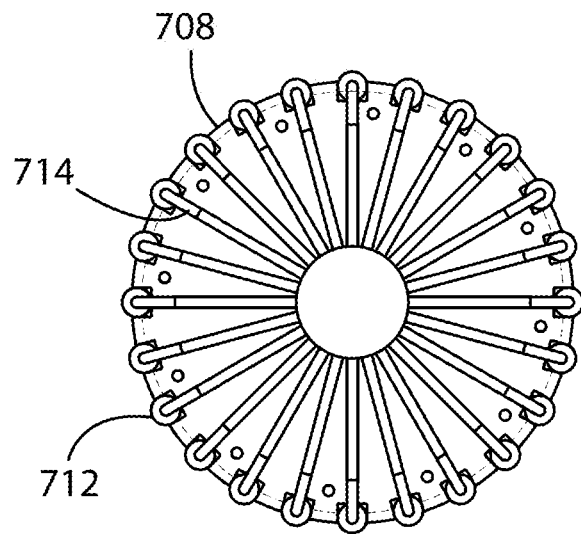
FIG. 59 illustrates a top view of the ring lifting or ring polishing assembly of FIG. 56 with inflated bladders.
Figure 60:
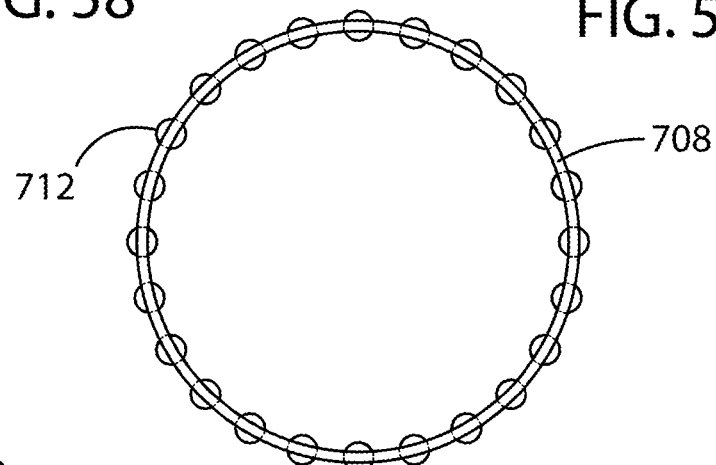
FIG. 60 illustrates a top view of the ring lifting or ring polishing assembly of FIG. 56 with inflated bladders taken along section line LX, LXI, LXII-LX, LXI, LXII on FIG. 56 with no workpiece.
Figure 61:
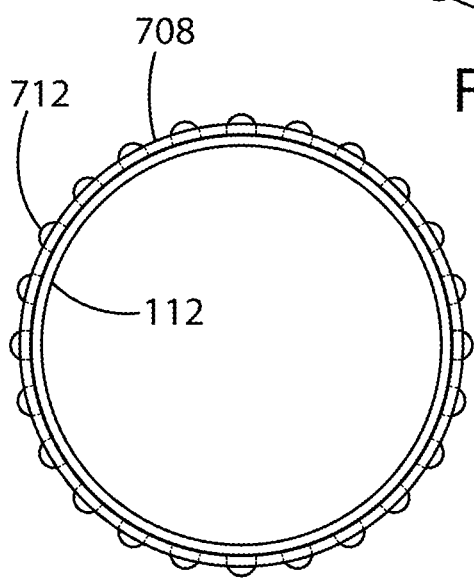
FIG. 61 illustrates a top view of the ring lifting or ring polishing assembly of FIG. 56 with inflated bladders taken along section line LX, LXI, LXII-LX, LXI, LXII on FIG. 56 with an internal workpiece.
Figure 62:
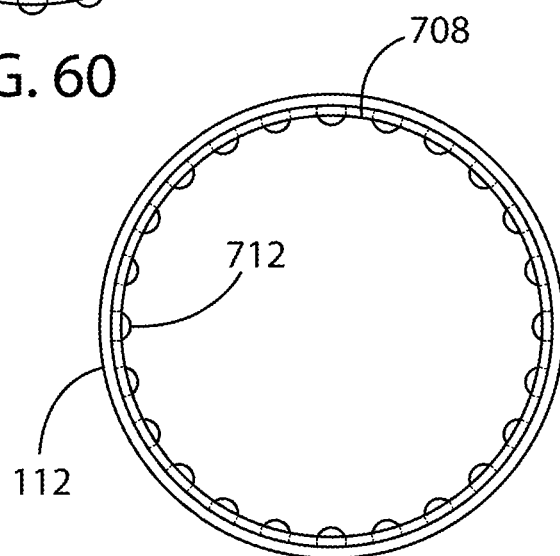
FIG. 62 illustrates a top view of the ring lifting or ring polishing assembly of FIG. 56 with inflated bladders taken along section line LX, LXI, LXII-LX, LXI, LXII on FIG. 56 with an external workpiece.

FIG. 58 illustrates a top view of the ring lifting or ring polishing assembly of FIG. 56 with deflated bladders. FIG. 59 illustrates a top view of the ring lifting or ring polishing assembly of FIG. 56 with inflated bladders. FIG. 60 illustrates a top view of the ring lifting or ring polishing assembly of FIG. 56 with inflated bladders taken along section line LX, LXI, LXII-LX, LXI, LXII on FIG. 56 with no workpiece. FIG. 61 illustrates a top view of the ring lifting or ring polishing assembly of FIG. 56 with inflated bladders taken along section line LX, LXI, LXII-LX, LXI, LXII on FIG. 56 with an internal workpiece. And, FIG. 62 illustrates a top view of the ring lifting or ring polishing assembly of FIG. 56 with inflated bladders taken along section line LX, LXI, LXII-LX, LXI, LXII on FIG. 56 with an external workpiece.

Figure 63:
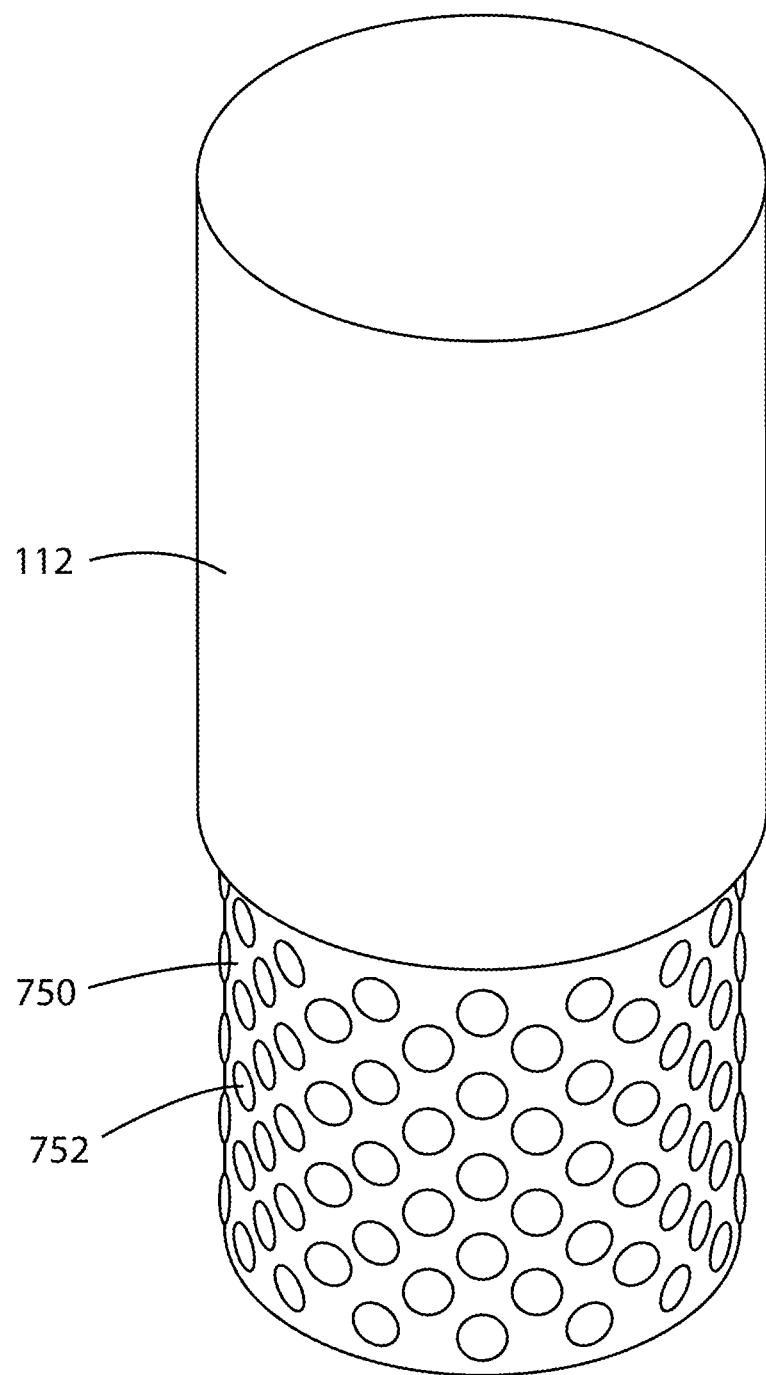
FIG. 63 illustrates a perspective view of a ring lifting or ring polishing assembly of present embodiments according to another approach having workpiece retraction bellows.
Figure 64:
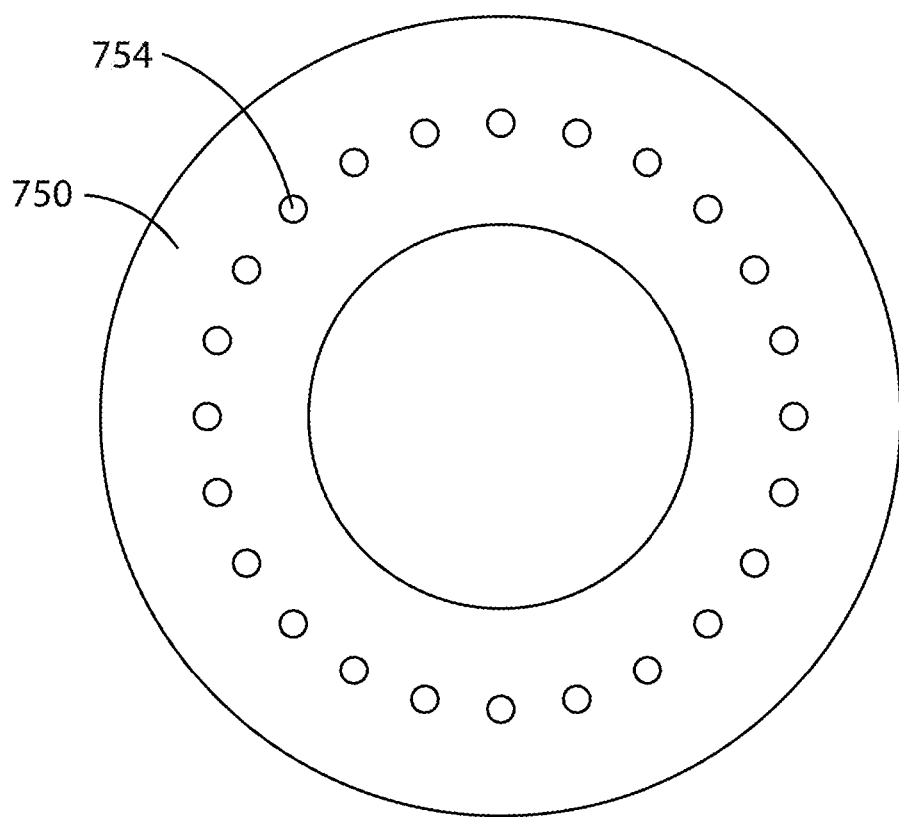
FIG. 64 illustrates top view a ring lifting or ring polishing assembly of FIG. 63.
Figure 65:
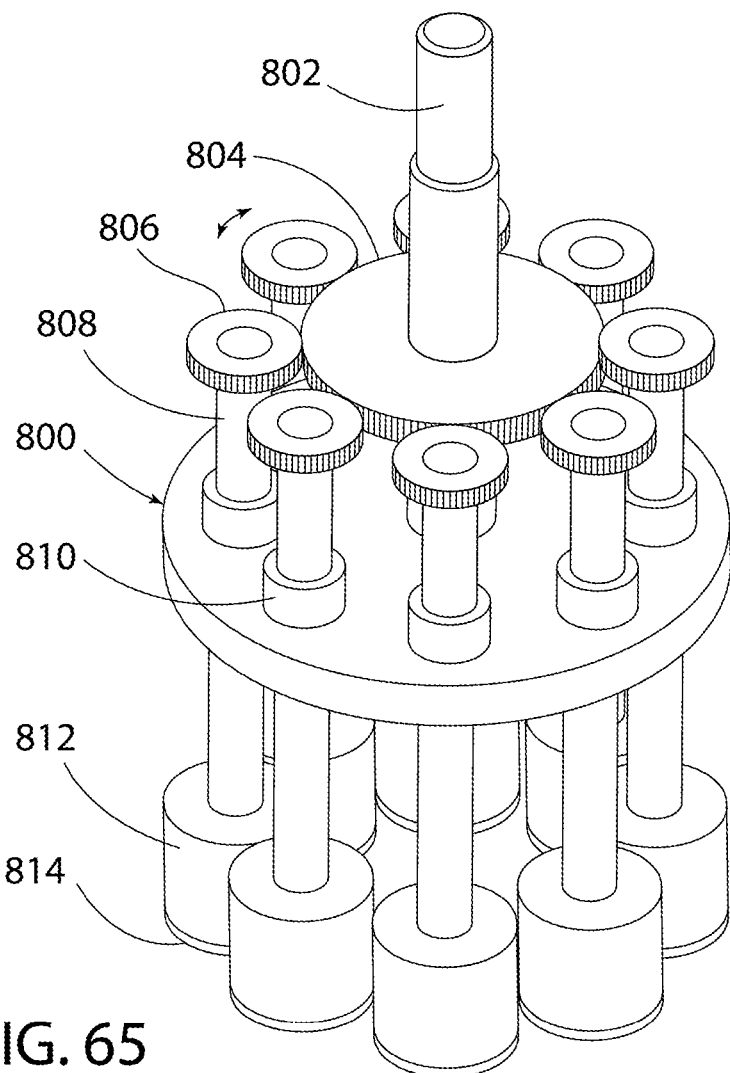
FIG. 65 illustrates a perspective view of a multiple cutting head ring cutting assembly of the present embodiments.
Figure 66:
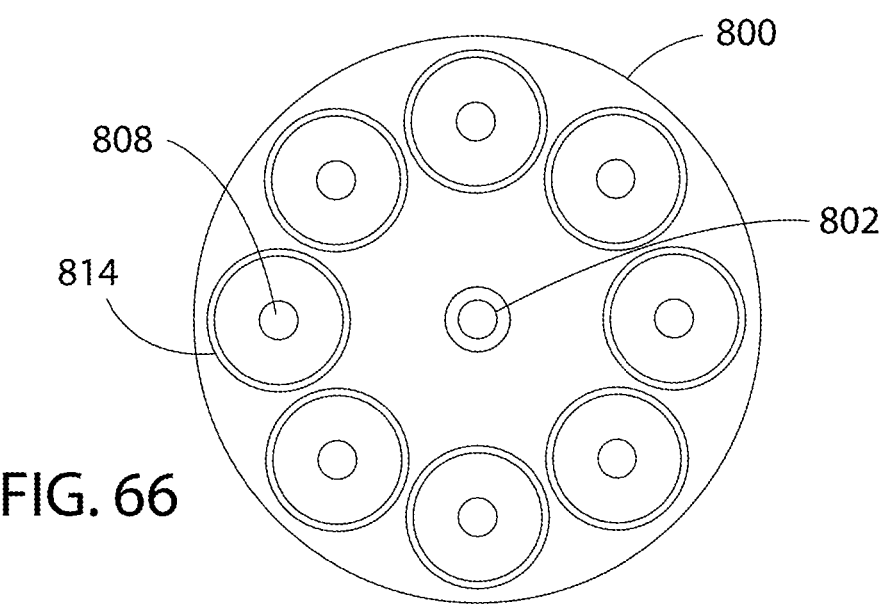
FIG. 66 illustrates a bottom end view the multiple cutting head ring cutting assembly of FIG. 63.
Figure 67:
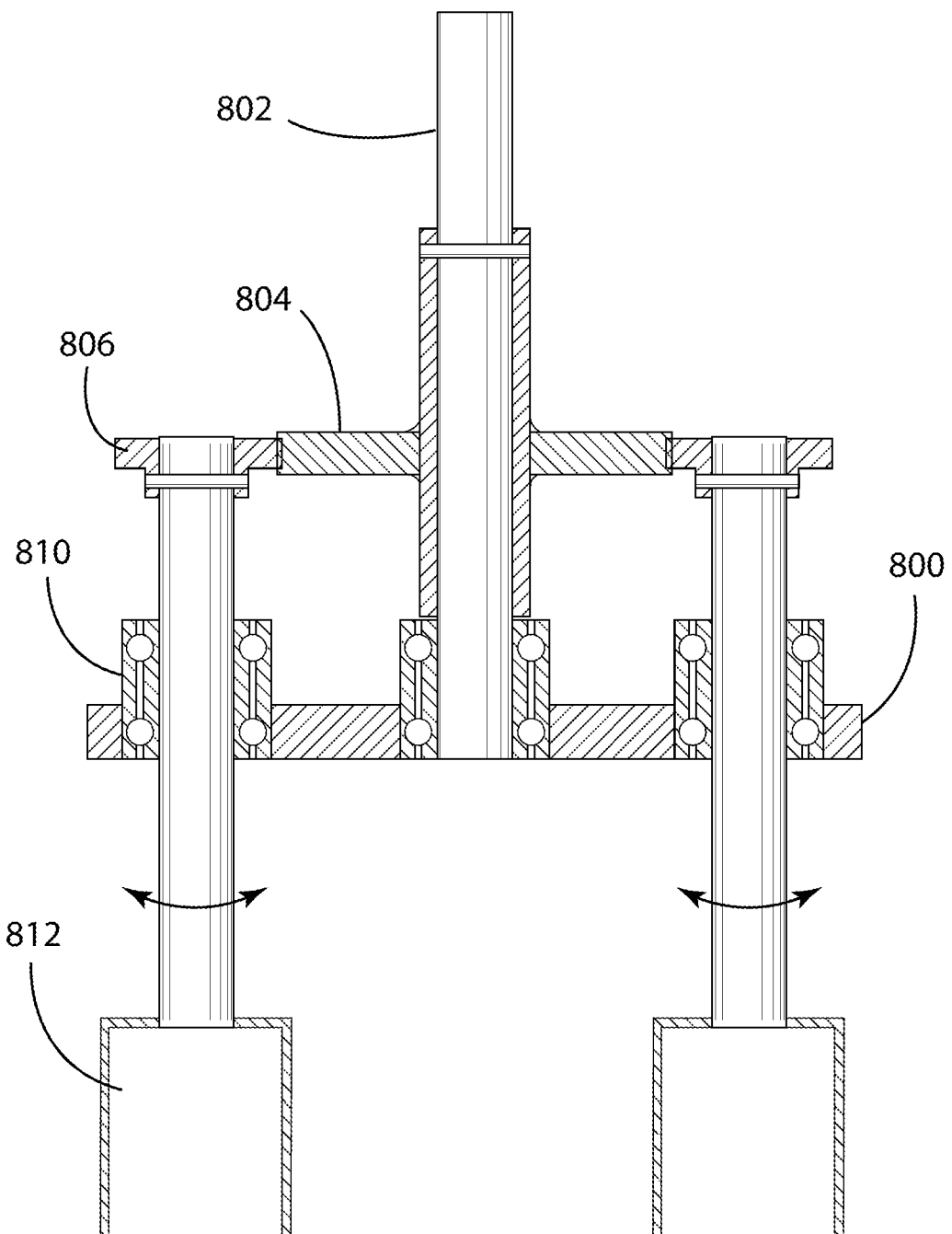
FIG. 67 illustrates a sectional view of the multiple cutting head ring cutting assembly of FIG. 65.

FIG. 63 illustrates a perspective view of a ring lifting or ring polishing assembly 750 of present embodiments according to another approach having workpiece retraction or polishing bellows 752. FIG. 64 illustrates top view a ring lifting or ring polishing assembly of FIG. 63. As shown, alternate workpiece retrieval assembly 750 can have expandable bladders 752 and channels 754 to receive pressurized liquid or gas to expand bladder 752. Bladder FIG. 65 illustrates a perspective view of a multiple cutting head ring cutting assembly 800 of the present embodiments, while FIG. 66 illustrates a bottom end view the multiple cutting head ring cutting assembly of FIG. 63. FIG. 67 illustrates a sectional view of the multiple cutting head ring cutting assembly of FIG. 65. As shown in the figures, multi-cutter head assembly 800 can have: a drive shaft 802; main gear 804; cutter gear 806; cutter drive shaft 808; cutter drive shaft mount 810; cutter extension 812; and cutter 814.

Figure 69:
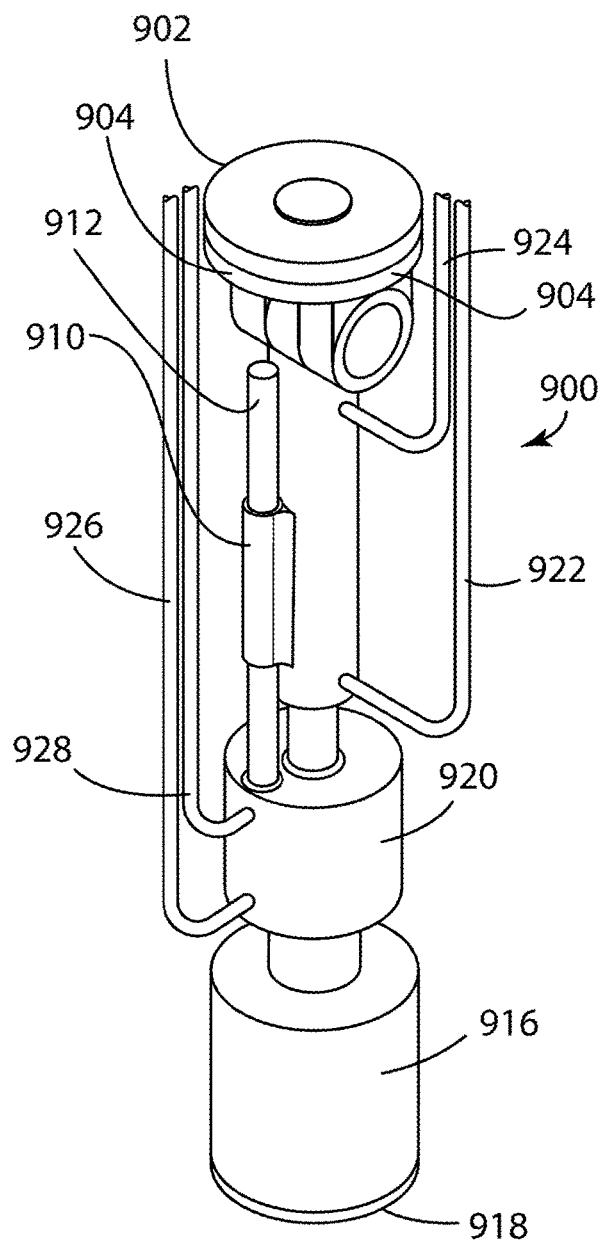
FIG. 69 illustrates a perspective view of a dual swivel cutter mount of FIG. 68 showing feed lines.
Figure 70:
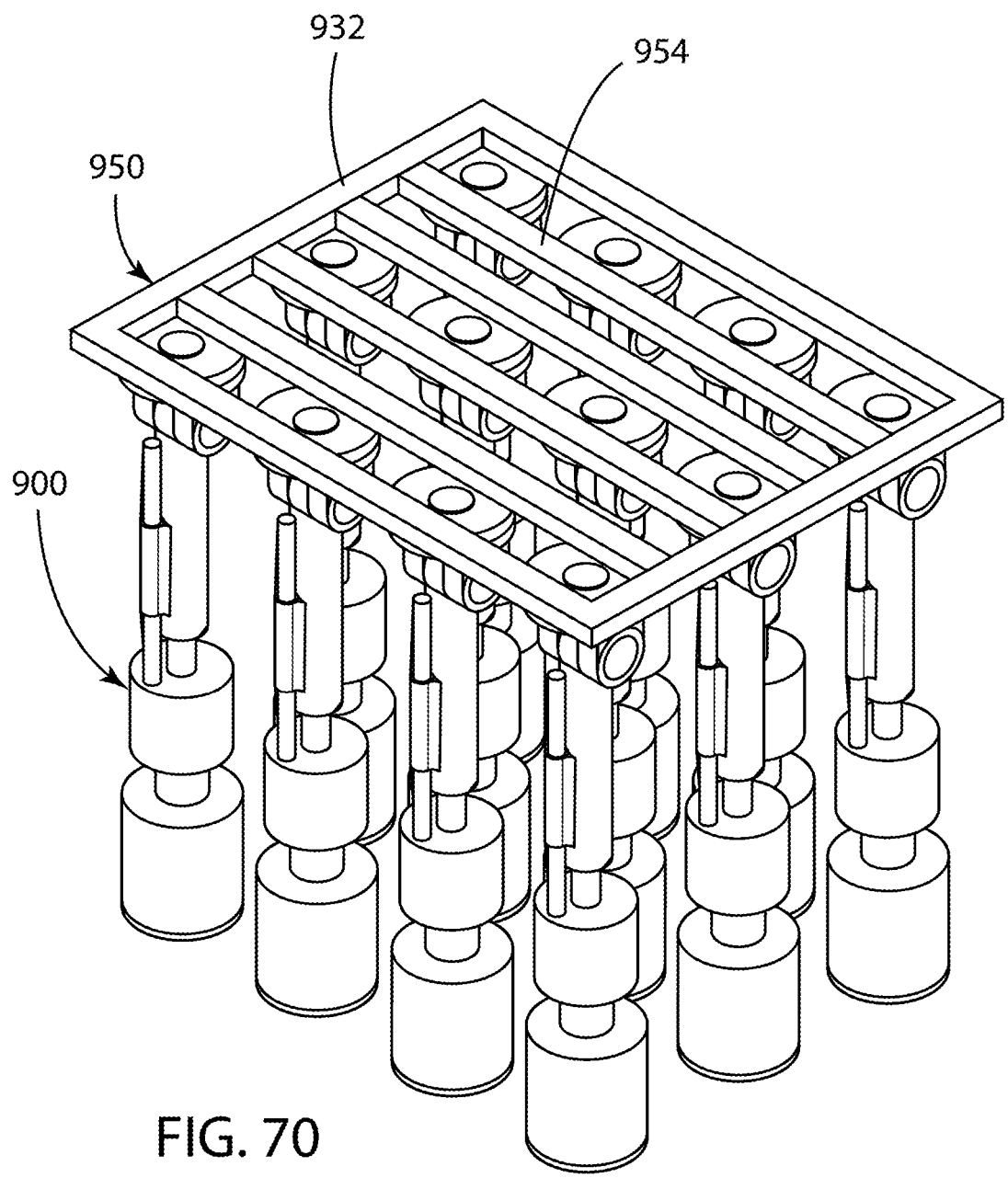
FIG. 70 illustrates a perspective view of an array of the dual swivel cutter mount of FIG. 68.

FIG. 68 illustrates a perspective view of a dual swivel cutter mount 900 of present embodiments according to another approach using a knuckle joint. FIG. 69 illustrates a perspective view of a dual swivel cutter mount of FIG. 68 showing feed lines. FIG. 70 illustrates a perspective view of an array of the dual swivel cutter mount of FIG. 68. In this embodiment, the rotating plate and knuckle allow the unit to find a square setting on large rock for each unit. A hydraulic cylinder attached to back of a hydraulic motor casing, along with an anti-rotation rod that slides within a guide tube mounted to side of cylinder. Motor is mounted to cutter and moves up and down with it. As shown in the figures, dual swivel cutter mount 900 can have: mounted rotating plate 902; rotating plate 904; knuckle joint 906; anti-rotation guide 910; hydraulic cylinder 912; drive shaft 914; cutter extension 916; cutter 918; and hydraulic motor 920. An option assembly 950 can hold multiple assembly 900 cutters and may include frame 932 having for assembly 950 struts 954 to hold multiple assembly 900.

The drawings and the foregoing descriptions are not intended to represent the only forms of the hole-saws in regard to the details of construction. Changes in form and in proportion of parts, as well as the substitution of equivalents, are contemplated as circumstances may suggest or render expedient.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS 49 roller/ball bearing
50 motive force (electric motor shown)
51 drive assembly
52 drive shaft
53 motive force carriage
54 drive shaft guide
55 motive force advance (ways)
56 pin clip retainers connected to platter having an opening to receive sliding guide 67
57 angled edge to engage with stop 59 of retention ring to drive locking pin clips 62 toward the center of the platter
58 retention ring (rotation engages or releases clips to clasp pins in drive rim)
59 retention ring stop to drive locking pin clips inward when rotated
60 retention torque ring for platter to drive shaft connection
61 squared teeth to mate with matching platter squared recesses
62 locking pin clips
63 locking pin clip 62 top edge to keep locking pin clip 62 locked into position against retention ring stop 59
64 first opening in locking pin clips 62
65 locking pin clip 62 side edge to extend over slots 74 of slotted platter 68 in locked position and into recess
66 second opening in locking pin clips 62
67 locking pin clip 62 guide to slide the pin clip retainers 56 opening
68 slotted platter
69 inner extension ring pins recess to connect on platter to edge 65 of locking pin clips 62
70 retention torque ring centered bore for drive shaft to extend through
71 squared recesses on platter 68 to mate with matching square teeth 61 on retention torque ring
72 platter centered bore for drive shaft to extend through
73 slot on outer extension ring to allow insertion of disk 100 on cutting ring 90
74 slots on platter 68
75 slot to allow insertion of mounting tab 89
76 spacer/washer for locking bolt
77 recessed portion at the distal end of slot 73 to receive and lock the 90 degree rotational locking disk for outer extension in place
78 locking bolt to tie platter assembly to threaded drive shaft
79 threaded portion of drive shaft
80 inner extension ring
82 inner extension ring pins to connect on platter
84 receptacle for locking disk 88 to rotate into on cutting ring 86
86 inner cutter ring
87 inner cutting ring cutting surface edge
88 90 degree rotational locking disk for inner extension
89 locking disk mounting tab for inner extension
90 outer extension ring
91 outer extension ring pins to connect on platter (locking disk 100 mounting tab)
92 slot and receptacle for locking disk 100 to rotate into on cutting ring 96
94 extension ring pin recess to connect on platter to edge 65 of locking pin clips 62
96 outer cutting ring
98 locking disk mounting tab for outer extension
100 90 degree rotational locking disk for outer extension ring
101 holes to receive key 105
102 outer cutting ring cutting surface edge
103 pins on key 105 to match holes 100
104 hydraulic internal cutting/polishing arm
105 key to rotate locking disk 100
106 hydraulic mechanism for internal cutting arm 104
107 grab handle for key 105
108 cutter or polisher for internal cutting arm 104
109 hinge for internal cutting arm 104
110 hydraulic line in
111 hydraulic line out
112 work piece
113 conduit to retrieve cuttings and the like
114 cut from inner cutter 80
116 cut from outer cutter 90
118 hollow cylinder from work piece 112
120 solid cylinder from work piece 112
122 bore in hollow cylinder 118
124 beveled edge illustrations from internal lateral cutter 104 on cutting ring 96 or extension ring 90
124i level edge alternate lateral cut to allow removal of the column from the workpiece
126 beveled edge illustrations from a second internal lateral cutter 104 on cutting ring 96 or extension 90
128 platter 68i threaded pins
130 platter 68i threaded holes for accepting threaded pins on extension rigs or cutting rings
132 threaded lugs for accepting through holes on extension rings and cutting rings
134 alignment rods
136 side bore alignment holes
137 cutter 80 holes to allow mounting on alignment rods 134
138 collar for alignment rods on platter 68iii
140 platter 68iv grid of holes for accepting threaded pins on extension rigs or cutting rings
142 platter 68v grid of holes for accepting threaded pins on extension rigs or cutting rings arranged in concentric rings
144 platter 68v grid of lateral holes for accepting threaded pins on extension rigs or cutting rings arranged as stacked rings
150 cage to align cutter and hold/stabilize workpiece 112
152 vertical supports for cage 150
154 horizontal supports for cage 150
155 horizontal supports for cage 150
156 nut
158 threaded rod
160 ball bearing housing
162 ball bearing
164 spring loaded tip/pilot
166 spring loaded clamp to hold work piece
200 processor assembly
210 exemplary system to implement some of the present embodiments
212 processor module
214 memory
216 user interface
218 communication links 220 communication interfaces, ports, transceivers
222 display
224 user inputs
234 one or more input/output (I/O) ports
240 power
300 exemplary system
301 system start
302 login to system
304 data input for credentials and cutting instructions
306 in response to data input, device is activated
308 system receives data
310 system processes data during device activation
312 in response to completed instructions,
344 device activates machine
322 outputs status to user
316 when machine activate, system waits to input that task is completed
318 screen status allows user to monitor progress of job
320 device deactivates machine on completion
322 outputs status to user
382 orientation, inertia sensor
462 diamond encrusted steel or other abrasive surface;
464 cutter thickness (1 mm to 2 meters depending on sound engineering principles and the workpiece and desired product)
466 tab to allow attachment to platter 68
468 interior abrasive surface
472 base of 474 to mount to platter 68
474 water jet, EDM or laser cutter
473 nozzle for cutting medium
476 cutting stream of laser light, water or electrons, and the like
485 water jet, EDM or laser cutter with pivoting head
486 mount for swivel discharging head
488 nozzle for cutting medium
490 range of swivel (up to 180 degrees)
494 swivel head mounted inside of extension 90ii
496 range of swivel (up to 180 degrees)
500 extension spring
510 pin clip hydraulic mechanism
520 pin clip slot
530 extension ring pin
600 retention shaft head (FIG. 37)
601 retention ring handle (FIG. 37
602 track for retention head (FIG. 37)
604 retention shaft (FIG. 37)
610 retention head (FIG. 54)
612 track for retention head (FIG. 54)
700 workpiece retrieval assembly (FIG. 56-62)
702 workpiece retrieval assembly drive shaft
704 workpiece retrieval assembly driveshaft flange to mount housing 708
706 workpiece retrieval assembly bolt to mount flange to housing
708 workpiece retrieval assembly bladder housing
710 workpiece retrieval assembly recess to receive bladder
712 workpiece retrieval assembly expandable bladder
714 workpiece retrieval assembly connection to compressive force to expand bladder 712
716 workpiece retrieval assembly threaded bore to receive bolt 706
718 workpiece retrieval assembly flange opening for bolts
750 alternate workpiece retrieval assembly (FIGS. 63-64)
752 alternate workpiece retrieval assembly expandable bladders
754 alternate workpiece retrieval assembly channels to receive pressurized liquid or gas to expand bladder 752
800 alternate multi-cutter head assembly (FIGS. 65-67)
802 alternate multi-cutter head assembly drive shaft
804 alternate multi-cutter head assembly main gear
806 alternate multi-cutter head assembly cutter gear
808 alternate multi-cutter head assembly cutter drive shaft
810 alternate multi-cutter head assembly cutter drive shaft mount
812 alternate multi-cutter head assembly cutter extension
814 alternate multi-cutter head assembly cutter
900 alternate cutter head assembly with knuckle joint
902 assembly 900 mounted rotating plate
904 assembly 900 rotating plate
906 assembly 900 knuckle joint
910 assembly 900 anti-rotation guide
912 assembly 900 hydraulic cylinder
914 assembly 900 drive shaft
916 assembly 900 cutter extension
918 assembly 900 cutter
920 assembly 900 hydraulic motor
950 assembly to hold multiple assembly 900 cutters
932 frame for assembly 950
954 struts to hold multiple assembly 900

I claim:
1. A hole-saw device, comprising:
a motive force;
a base plate rotatable by the motive force;
at least one cutter; and
locking mechanisms to mount the base plate to the at least one cutter;
wherein the base plate is a slotted platter, the slotted platter having a plurality of slots radiating outwardly from a slotted platter center;
wherein the locking mechanisms to mount the slotted platter to the at least one cutter comprise locking pin clips slidably mountable to the slotted platter along the plurality of slots;
wherein the at least one cutter has a plurality of tabs configured extend through the plurality of slots, the plurality of tabs having a notched recess to connect the at least one cutter onto the platter by an edge of the locking pin clips; and
wherein the at least one cutter is configured to be lockably retained to the platter by sliding, then securing, the locking pin clips towards the slotted platter center until the locking pin clip edge extends into the notched recess, whereby the at least one cutter is are retained thereon;
wherein each at least one cutter comprises an assembly having a cylindrical extension mountable to the slotted platter on a first end;
a cutting ring mount to mount a cutting ring along an entire circumference of the cylindrical extension on a second end;
wherein the cutting ring mount comprises a plurality of tabs configured to slidably extend into corresponding slots on the second end of the cylindrical extension, the corresponding slots having a recessed portion at its distal end to receive a rotatable locking disk disposed at a distal end of the plurality of tabs;
wherein the rotatable locking disk has a first position to allow entry of the plurality of tabs into the corresponding slots and the rotatable locking disk rotatable into a second position into the recessed portion of the corresponding slots; and wherein the locking disk has a rotational axis that is perpendicular to a longitudinal axis of the hole saw.

2. The hole-saw device of claim 1, where the slotted platter allows attachment of two or more at least one cutter.

3. The device of claim 1, further comprising a transverse cutter, configured to cut interior to the cutter.

4. The device of claim 1, further comprising a transverse cutter, configured to cut exterior to the cutter.

5. The device of claim 1, further comprising a transverse cutter, configured to cut interior and exterior to the cutter.

6. The hole-saw device of claim 1, further comprising an assembly to move the slotted platter into a work piece or substrate by a movement device comprising:
   a controller to control movement of the slotted platter;
   a motive force mounted to a motive force carriage assembly slidable along a plate having ways on which movement of the motive force carriage is guided.

7. The device of claim 1, further comprising a means to retrieve a workpiece from the substrate.

8. The device of claim 1 wherein the device facilitates lifting of cylindrical elements from work centers and/or will facilitate movement of any cylindrical shaped objects from one location to another.

9. The device of claim 1 wherein the device facilitates sanding and/or polishing on interior or exterior cylindrical surfaces.

10. The device of claim 1 creates a stabilizer mechanism to minimize device wobble and facilitate cylindrical cutting from any given material with or without a guide bit.

11. The hole-saw device of claim 1, wherein the rotatable locking disk is rotatable by a key having a grab handle and at least two pins positioned to be received by corresponding holes in the rotatable locking disk.

* * * * *